United States Patent
Liu et al.

(10) Patent No.: US 12,407,946 B2
(45) Date of Patent: Sep. 2, 2025

(54) IMAGING SYSTEM AND DEPTH DETECTION SYSTEM COMBINING LIGHT-FIELD IMAGING AND STRUCTURED-LIGHT IMAGING

(71) Applicant: City University of Hong Kong, Kowloon (HK)

(72) Inventors: Xiaoyuan Liu, Kowloon (HK); Mu Ku Chen, Kowloon (HK); Din Ping Tsai, Kowloon (HK)

(73) Assignee: City University of Hong Kong, Kowloon (HK)

(*) Notice: Subject to any disclaimer, the term of this patent is extended or adjusted under 35 U.S.C. 154(b) by 305 days.

(21) Appl. No.: 18/155,201

(22) Filed: Jan. 17, 2023

(65) Prior Publication Data

US 2024/0089615 A1   Mar. 14, 2024

(30) Foreign Application Priority Data

Sep. 8, 2022 (CN) .......................... 202211093767.4

(51) Int. Cl.
*H04N 5/335* (2011.01)
*G02B 27/28* (2006.01)
(Continued)

(52) U.S. Cl.
CPC ......... *H04N 23/957* (2023.01); *G02B 27/285* (2013.01); *G06T 7/557* (2017.01);
(Continued)

(58) Field of Classification Search
CPC .............................. G06T 7/557; H04N 23/957
See application file for complete search history.

(56) References Cited

U.S. PATENT DOCUMENTS 10,591,643 B2    3/2020  Lin et al.
2005/0001035 A1*  1/2005  Hawley .............. G06K 7/10851
                                                           235/462.21
(Continued)

FOREIGN PATENT DOCUMENTS

CN       111624830 A     9/2020
CN       214591765 U    11/2021

OTHER PUBLICATIONS

H. H. Hsiao, C. H. Chu, D. P. Tsai, Small Methods 2017, 1, 1600064. Fundamentals and Applications of Metasurfaces.
(Continued)

*Primary Examiner* — Gary C Vieaux
(74) *Attorney, Agent, or Firm* — Renner, Kenner, Greive, Bobak, Taylor & Weber

(57) ABSTRACT

An imaging system including an image acquisition device, a light-field imaging arrangement including an optical meta-device operable to facilitate imaging of a light-field of a target scene, and a structured-light imaging arrangement including an optical meta-device operable to facilitate generation of structured-light to be provided to a target scene to facilitate imaging of the target scene. The light-field imaging arrangement and the structured-light imaging arrangement are operably coupled with the image acquisition device such that the imaging system is selectively operable in, at least, a light-field imaging mode for performing light-field imaging of the target scene and a structured-light imaging mode for performing structured-light imaging of the target scene. The optical meta-device of the light-field imaging arrangement and the optical meta-device of the structured-light imaging arrangement may be provided by the same optical meta-device.

24 Claims, 25 Drawing Sheets

(51) Int. Cl.
  *G06T 7/557* (2017.01)
  *H04N 23/957* (2023.01)
(52) U.S. Cl.
  CPC ............... *G02B 2207/101* (2013.01); *G06T 2207/10028* (2013.01); *G06T 2207/20081* (2013.01)

(56) References Cited

U.S. PATENT DOCUMENTS

| | | | | |
|---|---|---|---|---|
| 2017/0236286 | A1* | 8/2017 | Fanello | G06F 18/24323 382/154 |
| 2020/0225386 | A1* | 7/2020 | Tsai | G02B 1/002 |
| 2023/0127423 | A1* | 4/2023 | Park | G02B 1/002 359/356 |
| 2023/0316017 | A1* | 10/2023 | Bleicher | G06K 7/10722 235/462.2 |

OTHER PUBLICATIONS

A. Barker Jr, M. Ilegems, Phys. Rev. B 1973, 7, 743. Infrared Lattice Vibrations and Free-Electron Dispersion in GaN.
S. M. Wang, P. C. Wu, V. C. Su, Y. C. Lai, M. K. Chen, H. Y. Kuo, B. H. Chen, Y. H. Chen, T. T. Huang, J. H. Wang, R. M. Lin, C. H. Kuan, T. Li, Z. L. Wang, S. N. Zhu, D. P. Tsai, Nat. Nanotechnol. 2018, 13, 227. A broadband achromatic metalens in the visible.
W. Burger, M. J. Burge, in Digital Image Processing: An Algorithmic Introduction Using Java, Springer London, London 2016, 413. Edge-Preserving Smoothing Filters.
J. Canny, IEEE Transactions on pattern analysis and machine intelligence 1986, 679. A Computational Approach to Edge Detection.
N. Otsu, IEEE transactions on systems, man, and cybernetics 1979, 9, 62. A Threshold Selection Method from Gray-Level Histograms.
R. Girshick, in Proceedings of the IEEE international conference on computer vision, 2015. Fast R-CNN.
D. P. Kingma, J. Ba, arXiv preprint arXiv:1412.6980 2014. ADAM: a Method for Stochastic Optimization.
K. Tateno, F. Tombari, I. Laina, N. Navab, IEEE Conf. on CVPR, Honolulu, HI 2017. CNN-SLAM: Real-time dense monocular SLAM with learned depth prediction.
P. Xu, X. Ding, R. Wang, X. Wu, J. Text. Inst. 2016, 107, 12. Feature-based 3D reconstruction of fabric by binocular stereovision.
D. Li, L. Xu, X.-s. Tang, S. Sun, X. Cai, P. Zhang, Remote Sens. 2017, 9, 508. 3D Imaging of Greenhouse Plants with an Inexpensive Binocular Stereo Vision System.
H.-G. Jeon, J. Park, G. Choe, J. Park, Y. Bok, Y.-W. Tai, I. S. Kweon, IEEE Conf. on CVPR, Boston, MA 2015. Accurate Depth Map Estimation from a Lenslet Light Field Camera.
Y. Bok, H.-G. Jeon, I. S. Kweon, IEEE Trans. Pattern Anal. Mach. Intell. 2016, 39, 287. Geometric Calibration of Micro-Lens-Based Light Field Cameras Using Line Features.
J. Geng, Adv. Opt. Photonics 2011, 3, 128. Structured-light 3D surface imaging: a tutorial.
S. Zhang, Opt. Lasers Eng. 2018, 106, 119. High-speed 3D shape measurement with structured light methods: A review.
B. Behroozpour, P. A. Sandborn, M. C. Wu, B. E. Boser, IEEE Commun. Mag. 2017, 55, 135. Lidar System Architectures and Circuits.
J. Hecht, Opt. Photonics News 2018, 29, 26. Lidar for Self-Driving Cars.
J. Zhu, L. Wang, R. Yang, J. E. Davis, IEEE Trans. Pattern Anal. Mach. Intell. 2010, 33, 1400. Reliability Fusion of Time-of-Flight Depth and Stereo Geometry for High Quality Depth Maps .
A. R. Ximenes, P. Padmanabhan, M.-J. Lee, Y. Yamashita, D.-N. Yaung, E. Charbon, IEEE J. Solid-State Circuits 2019, 54, 3203. A Modular, Direct Time-of-Flight Depth Sensor in 45/65-nm 3-D-Stacked CMOS Technology.
I. Kim, R. J. Martins, J. Jang, T. Badloe, S. Khadir, H.-Y. Jung, H. Kim, J. Kim, P. Genevet, J. Rho, Nat. Nanotechnol. 2021, 16, 508. Nanophotonics for light detection and ranging technology.
S. L. Sun, K. Y. Yang, C. M. Wang, T. K. Juan, W. T. Chen, C. Y. Liao, Q. He, S. Y. Xiao, W. T. Kung, G. Y. Guo, L. Zhou, D. P. Tsai, Nano Lett. 2012, 12, 6223. High-Efficiency Broadband Anomalous Reflection by Gradient Meta-Surfaces.
H. H. Hsiao, C. H. Chu, D. P. Tsai, Small Methods 2017, 1, 20. Fundamentals and Applications of Metasurfaces.
V. C. Su, C. H. Chu, G. Sun, D. P. Tsai, Opt. Express 2018, 26, 13148. Advances in optical metasurfaces: fabrication Advances in optical metasurfaces: fabrication and applications [invited].
M. Zhao, M. K. Chen, Z .- P. Zhuang, Y. Zhang, A. Chen, Q. Chen, W. Liu, J. Wang, Z.-M. Chen, B. Wang, Light: Sci. Appl. 2021, 10, 52. Phase characterisation of metalenses.
Y. Guo, Y. Huang, X. Li, M. Pu, P. Gao, J. Jin, X. Ma, X. Luo, Adv. Opt. Mater. 2019, 7, 1900503. Polarization-Controlled Broadband Accelerating Beams Generation by Single Catenary-Shaped Metasurface.
G. M. Akselrod, J. Huang, T. B. Hoang, P. T. Bowen, L. Su, D. R. Smith, M. H. Mikkelsen, Adv. Mater. 2015, 27, 8028. Large-Area Metasurface Perfect Absorbers from Visible to Near-Infrared.
P. C. Wu, J. W. Chen, C. W. Yin, Y. C. Lai, T. L. Chung, C. Y. Liao, B. H. Chen, K. W. Lee, C. J. Chuang, C. M. Wang, D. P. Tsai, ACS Photonics 2018, 5, 2568. Visible Metasurfaces for On-Chip Polarimetry.
M. Semmlinger, M. Zhang, M. L. Tseng, T. T. Huang, J. Yang, D. P. Tsai, P. Nordlander, N. J. Halas, Nano Lett. 2019, 19, 8972. Generating Third Harmonic Vacuum Ultraviolet Light with a TiO2 Metasurface.
W. Y. Tsai, T. L. Chung, H. H. Hsiao, J. W. Chen, R. J. Lin, P. C. Wu, G. Sun, C. M. Wang, H. Misawa, D. P. Tsai, Adv. Mater. 2019, 31, 7. Second Harmonic Light Manipulation with Vertical Split Ring Resonators.
E. Galiffi, J. B. Pendry, P. A. Huidobro, ACS Nano 2018, 12, 1006. Broadband Tunable THz Absorption with Singular Graphene Metasurfaces.
L. Li, Y. Shuang, Q. Ma, H. Li, H. Zhao, M. Wei, C. Liu, C. Hao, C.-W. Qiu, T. J. Cui, Light: Sci. Appl. 2019, 8, 97. Intelligent metasurface imager and recognizer.
X. Luo, Adv. Mater. 2019, 31, 1804680. Subwavelength Artificial Structures: Opening a New Era for Engineering Optics.
M. L. Tseng, H. H. Hsiao, C. H. Chu, M. K. Chen, G. Sun, A. Q. Liu, D. P. Tsai, Adv. Opt. Mater. 2018, 6, 1800554. Metalenses: Advances and Applications.
W. Ma, Z. Liu, Z. A. Kudyshev, A. Boltasseva, W. Cai, Y. Liu, Nat. Photonics 2020, 15, 77. Deep learning for the design of photonic structures.
M. K. Chen, Y. Wu, L. Feng, Q. Fan, M. Lu, T. Xu, D. P. Tsai, Adv. Opt. Mater. 2021, 9, 2001414. Principles, Functions, and Applications of Optical Meta-Lens.
F. Zhang, M. Pu, X. Li, X. Ma, Y. Guo, P. Gao, H. Yu, M. Gu, X. Luo, Adv. Mater. 2021, 33, 2008157. Extreme-Angle Silicon Infrared Optics Enabled by Streamlined Surfaces.
H. Wang, C. Hao, H. Lin, Y. Wang, T. Lan, C.-W. Qiu, B. Jia, Opto-Electron. Adv. 2021, 4, 02200031. Generation of super-resolved optical needle and multifocal array using graphene oxide metalenses.
Y. Wang, Q. Fan, T. Xu, Opto-Electron. Adv. 2021, 4, 01200008. Design of high efficiency achromatic metalens with large operation bandwidth using bilayer architecture.
X. Luo, F. Zhang, M. Pu, Y. Guo, X. Li, X. Ma, Nanophotonics 2022, 11, 1. Recent advances of wide-angle metalenses: principle, design, and applications.
G. Yoon, K. Kim, S.-U. Kim, S. Han, H. Lee, J. Rho, ACS Nano 2021, 15, 698. Printable Nanocomposite Metalens for High-Contrast Near-Infrared Imaging.
M. K. Chen, C. H. Chu, R. J. Lin, J. W. Chen, Y. T. Huang, T. T. Huang, H. Y. Kuo, D. P. Tsai, Jpn. J. Appl. Phys. 2019, 58, 8. Optical meta-devices: advances and applications.
R. J. Lin, V. C. Su, S. M. Wang, M. K. Chen, T. L. Chung, Y. H. Chen, H. Y. Kuo, J. W. Chen, J. Chen, Y. T. Huang, J. H. Wang, C.

(56) References Cited

OTHER PUBLICATIONS

H. Chu, P. C. Wu, T. Li, Z. L. Wang, S. N. Zhu, D. P. Tsai, Nat. Nanotechnol. 2019, 14, 227. Achromatic metalens array for full-colour light-field imaging.
M. K. Chen, Y. Yan, X. Liu, Y. Wu, J. Zhang, J. Yuan, Z. Zhang, D. P. Tsai, Nanophotonics 2021, 10, 3709. Edge detection with metalens: from one dimension to three dimensions.
S. Colburn, A. Zhan, A. Majumdar, Optica 2018, 5, 825. Varifocal zoom imaging with large area focal length adjustable metalenses.
M. Y. Shalaginov, S. An, Y. Zhang, F. Yang, P. Su, V. Liberman, J. B. Chou, C. M. Roberts, M. Kang, C. Rios, Nat. Commun. 2021, 12, 1225. Reconfigurable all-dielectric metalens with diffraction-limited performance.
B. H. Chen, P. C. Wu, V. C. Su, Y. C. Lai, C. H. Chu, I. C. Lee, J. W. Chen, Y. H. Chen, Y. C. Lan, C. H. Kuan, D. P. Tsai, Nano Lett. 2017, 17, 6345. GaN Metalens for Pixel-Level Full-Color Routing at Visible Light.
Y. Guo, X. Ma, M. Pu, X. Li, Z. Zhao, X. Luo, Adv. Opt. Mater. 2018, 6, 1800592. High-Efficiency and Wide-Angle Beam Steering Based on Catenary Optical Fields in Ultrathin Metalens.
L. Li, Z. Liu, X. Ren, S. Wang, V.-C. Su, M.-K. Chen, C. H. Chu, H. Y. Kuo, B. Liu, W. Zang, G. Guo, L. Zhang, Z. Wang, S. Zhu, D. P. Tsai, Science 2020, 368, 1487. Metalens-array-based high-dimensional and multiphoton quantum source.
A. S. Solntsev, G. S. Agarwal, Y. Y. Kivshar, Nat. Photonics 2021, 15, 327. Metasurfaces for quantum photonics.
Q. Guo, Z. Shi, Y.-W. Huang, E. Alexander, C.-W. Qiu, F. Capasso, T. Zickler, Proc. Natl. Acad. Sci. USA 2019, 116, 22959. Compact single-shot metalens depth sensors inspired by eyes of jumping spiders.
C. Jin, M. Afsharnia, R. Berlich, S. Fasold, C. Zou, D. Arslan, I. Staude, T. Pertsch, F. Setzpfandt, Adv. Photonics 2019, 1, 036001. Dielectric metasurfaces for distance measurements and three-dimensional imaging.
S. M. Wang, P. C. Wu, V. C. Su, Y. C. Lai, C. H. Chu, J. W. Chen, S. H. Lu, J. Chen, B. B. Xu, C. H. Kuan, T. Li, S. N. Zhu, D. P. Tsai, Nat. Commun. 2017, 8, 9. Broadband achromatic optical metasurface devices.
H. H. Hsiao, Y. H. Chen, R. J. Lin, P. C. Wu, S. M. Wang, B. H. Chen, D. P. Tsai, Adv. Opt. Mater. 2018, 6, 10, Integrated Resonant Unit of Metasurfaces for Broadband Efficiency and Phase Manipulation.
K. He, X. Zhang, S. Ren, J. Sun, Proceedings of the IEEE Conference on Computer Vision and Pattern Recognition, IEEE, Las Vegas, NV 2016. Deep Residual Learning for Image Recognition.
Chen, M. K., Liu, X., Wu, Y., Zhang, J., Yuan, J., Zhang, Z., Tsai, D. P., A Meta-Device for Intelligent Depth Perception. Adv. Mater. 2022, 2107465. https://doi.org/10.1002/adma.202107465; A Meta-Device for Intelligent Depth Perception.
Chen, M. K., Liu, X., Wu, Y., Zhang, J., Yuan, J., Zhang, Z., Tsai, D. P., A Meta-Device for Intelligent Depth Perception *Supporting Information. Adv. Mater. 2022, 2107465. https://doi.org/10.1002/adma.202107465.
M. Sandler, A. Howard, M. Zhu, A. Zhmoginov, L.-C. Chen, MobileNetV2: Inverted Residuals and Linear Bottlenecks in IEEE Conf. on CVPR, Salt Lake City, UT, USA, Jun. 2018.
C. Godard, O. M. Aodha, G. J. Brostow, UnsupervisedMonocular Depth Estimation with Left-Right Consistency, IEEE Conf. on CCVPR, Honolulu, HI 2017.

* cited by examiner

Figure 25

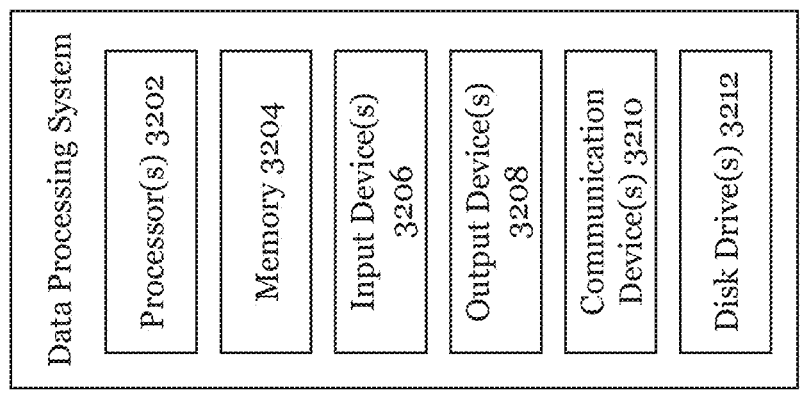
Figure 32
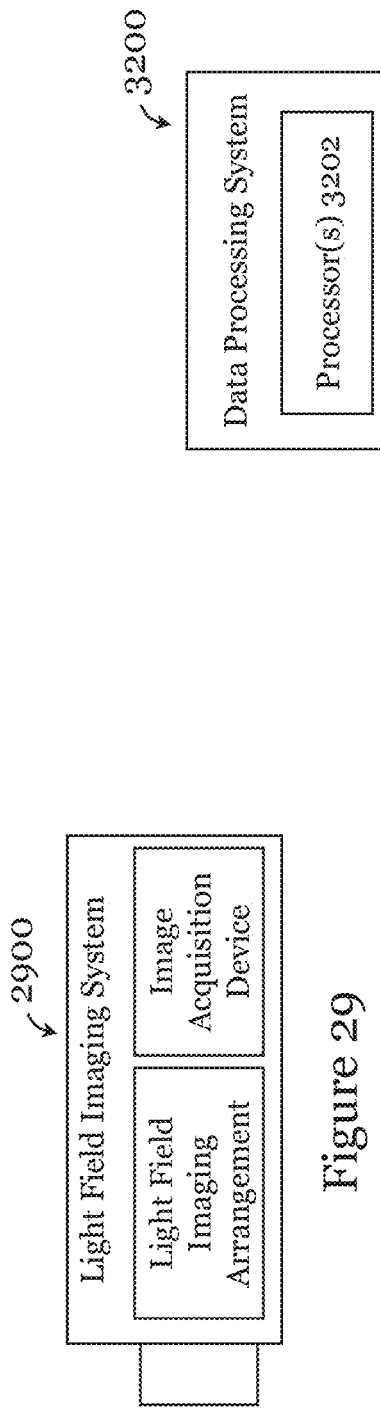
Figure 29
Figure 30
Figure 31

IMAGING SYSTEM AND DEPTH DETECTION SYSTEM COMBINING LIGHT-FIELD IMAGING AND STRUCTURED-LIGHT IMAGING

TECHNICAL FIELD

The invention relates to imaging systems, data processing systems, and depth detection systems.

BACKGROUND

Depth (or distance) imaging and/or detection systems can be used in applications such as autonomous driving, machine vision, human-computer interaction, and augmented reality, to obtain depth information associated with object(s) in a scene or field of view. Some existing depth imaging and/or detection systems can operate only under specific light conditions (e.g., brightness), which limit their applications and usefulness.

SUMMARY OF THE INVENTION

Some embodiments of the invention provide a compound optical system (compound imaging system). Some embodiments of the invention provide a depth detection system. Some embodiments of the invention provide an imaging system. Some embodiments of the invention provide a data processing system for processing images or image data obtained by or from the imaging system. Some embodiments of the invention provide an imaging system and/or depth detection system that can image and/or obtain depth information of a target scene under different light conditions (e.g., bright and dark conditions).

In a first aspect, there is provided a compound optical system that includes a meta-lens array, a laser source, and an image acquisition device. When light intensity is larger than a first predetermined light intensity, the laser source is in an OFF state, and the compound optical system forms a light-field imaging system, in which reflected light of the target scene forms a scene image on the image acquisition device through the meta-lens array. When the light intensity is smaller than a predetermined light intensity, the laser source is in an ON state, and the compound optical system forms a structured-light projection (imaging) system, in which laser beam emitted by the laser source projects to the target scene through the meta-lens array and forms a light spot array, which is reflected to the image acquisition device to form a light spot array image.

In some embodiments of the first aspect, the compound optical system further comprises: a first quarter-wave plate, a first linear polarizer, and a first polarization beam splitter. The first quarter-wave plate, the first linear polarizer, and the first polarization beam splitter are sequentially arranged between the target scene and the meta-lens array. The first linear polarizer and the first quarter-wave plate cooperate to perform filtering in an incident light path of the meta-lens array in the light-field imaging system and in an emerging light path of the meta-lens array in the structured-light projection system. The first polarization beam splitter is arranged to perform guiding in the incident light path of the meta-lens array in the light-field imaging system, in the emerging light path of the meta-lens array in the structured-light projection system, and in a reflected light path of the light spot array.

In some embodiments of the first aspect, the compound optical system further comprises: a beam splitter arranged between the meta-lens array and the image acquisition device, the beam splitter is operable to performing guiding in an emerging light path of the meta-lens array in the light-field imaging system and in an incident light path of the meta-lens array in the structured-light projection system.

In some embodiments of the first aspect, the compound optical system further comprises: a second linear polarizer, and a second polarization beam splitter. The second polarization beam splitter and the second linear polarizer are sequentially arranged between the beam splitter and the image acquisition device. The second polarization beam splitter is for performing guiding in an incident light path of the image acquisition device. The second linear polarizer is for performing filtering in the incident light path of the image acquisition device.

In some embodiments of the first aspect, the compound optical system further comprises: a second quarter-wave plate arranged between the beam splitter and the second polarization beam splitter. The second quarter-wave plate and the second linear polarizer cooperate to perform filtering in the incident light path of the image acquisition device in the light-field imaging system.

In some embodiments of the first aspect, the compound optical system further comprises: a third quarter-wave plate and a third linear polarizer. The third linear polarizer and the third quarter-wave plate are sequentially arranged between the laser source and the beam splitter. The third linear polarizer and the third quarter-wave plate cooperate to perform filtering on an emerging light path of the laser source in the structured-light projection system.

In some embodiments of the first aspect, the compound optical system further comprises a first reflector for guiding an emerging light path of the laser source to the beam splitter.

In some embodiments of the first aspect, the compound optical system further comprises: a second reflector and a third reflector. The second reflector and the third reflector cooperate to guide an emerging light path of the first polarization beam splitter to the second polarization beam splitter.

In some embodiments of the first aspect, the compound optical system further comprises: a receiver lens arranged between the first polarization beam splitter and the target scene. The reflected light of the target scene in the light-field imaging system forms a reflected light beam through the receiver lens.

In some embodiments of the first aspect, the meta-lens array includes a plurality of meta-lens arranged in an array, a phase distribution function of the meta-lens satisfy the following equation:

$$\varphi(R, \lambda) = -\left[2\pi\left(\sqrt{R^2 + f^2}\right) - f\right]\frac{1}{\lambda}, \lambda \in \{\lambda_{min}, \lambda_{max}\}$$

where $\varphi(R, \lambda)$ is the phase distribution function of the meta-lens, R is a distance from any point on the meta-lens to the geometric center of the meta-lens, $\lambda$ is wavelength of the incident light, and f is a preset focal length of the meta-lens.

In a second aspect, there is provided a depth detection system comprising the compound optical system of the first aspect, and a data processing device. The data processing device is arranged to generate depth information of the target scene based on the scene image obtained using the image acquisition device in the light-field imaging system; and generate depth information of the target scene based on the light spot array image obtained using the image acquisition device in the structured-light projection system.

The compound optical system and the depth detection system of some aspects/embodiments can selectively form a light-field imaging system (when light intensity is higher than a predetermined light intensity) and a structured-light projection/imaging system (when light intensity is lower than a predetermined light intensity). In the light-field imaging system: using the characteristics of the meta-lens array, that the amplitude, phase and/or resonance of the incident light can be flexibly controlled, no additional lens(es) is required to realize imaging requirements such as spherical aberration and broadband achromatic function. In the structured-light projection system: the meta-lens array projects laser beam emitted by the laser source as a light spot array to the target scene, and the target scene reflects the light spot array to the image acquisition device to form a light spot array image, thus depth information of the target scene can be generated and processed based on the shape and size of the light spots as well as the distance between the light spots in the light spot array image. Therefore, depth detection of the systems in these embodiments is less dependent on, or even not limited by, lighting conditions of the target scene or the ambient environment in which the system is arranged, and is generally not affected or limited by the texture level of the target scene.

In a third aspect, there is provided an imaging system comprising: an image acquisition device; a light-field imaging arrangement including an optical meta-device operable to facilitate imaging of a light-field of a target scene; and a structured-light imaging arrangement including an optical meta-device operable to facilitate generation of structured-light to be provided to a target scene to facilitate imaging of the target scene. The light-field imaging arrangement and the structured-light imaging arrangement are operably coupled with the image acquisition device such that the imaging system is selectively operable in, at least, a light-field imaging mode for performing light-field imaging of the target scene and a structured-light imaging mode for performing structured-light imaging of the target scene. With these arrangements, the imaging system can obtain light-field image of the target scene as well as structured-light image of the target scene, e.g., depending on the light condition associated with the environment in which the imaging system is arranged and/or the light condition associated with the target scene.

Optionally, the light-field imaging arrangement and the structured-light imaging arrangement include one or more common optical components. That is, one or more optical components of the imaging system are shared by the light-field imaging arrangement and the structured-light imaging arrangement (one or more optical components of the imaging system may belong to both the light-field imaging arrangement and the structured-light imaging arrangement).

Optionally, the optical meta-device of the light-field imaging arrangement is the optical meta-device of the structured-light imaging arrangement.

Optionally, the optical meta-device of the light-field imaging arrangement comprises a meta-lens array. The meta-lens array may include or consist of, e.g., a plurality of achromatic meta-lenses arranged in an array. The array can be regular or irregular. Optionally, the optical meta-device of the structured-light imaging arrangement comprises a meta-lens array. The meta-lens array may include or consist of, e.g., a plurality of achromatic meta-lenses arranged in an array. The array can be regular or irregular.

Optionally, the light-field imaging arrangement further includes: a lens arranged to receive light-field associated with the target scene; a first optical assembly optically coupled between the lens and the optical meta-device of the light-field imaging arrangement; and a second optical assembly optically coupled between the optical meta-device of the light-field imaging arrangement and the image acquisition device. The first optical assembly, the optical meta-device of the light-field imaging arrangement, and the second optical assembly are arranged to process the received light-field for imaging by the image acquisition device. The light-field imaging arrangement may include one or more further optical components arranged optically between the target scene and the image acquisition device.

Optionally, the first optical assembly of the light-field imaging arrangement comprises: a polarization beam splitter; a polarization manipulation assembly optically coupled with the polarization beam splitter; and an objective lens optically coupled with the polarization manipulation assembly. Optionally, the polarization manipulation assembly comprises: a quarter-wave plate and a linear polarizer that are optically coupled. The linear polarizer may be, e.g., a horizontal linear polarizer. Optionally, the linear polarizer is optically coupled between the quarter-wave plate and the polarization beam splitter. Optionally, the polarization beam splitter is optically coupled between the lens and the linear polarizer. Optionally, the quarter-wave plate is optically coupled between the linear polarizer and the objective lens.

Optionally, the second optical assembly of the light-field imaging arrangement comprises: an objective lens; and a polarization manipulation assembly optically coupled between the objective lens and the image acquisition device. Optionally, the second optical assembly further comprises a beam splitter optically coupled between the optical meta-device of the light-field imaging arrangement and the objective lens. Optionally, the polarization manipulation assembly comprises: a quarter-wave plate, a polarization beam splitter, and a linear polarizer that are optically coupled. The linear polarizer may be, e.g., a horizontal linear polarizer. Optionally, the linear polarizer is optically coupled between the polarization beam splitter and the image acquisition device. Optionally, the polarization beam splitter is optically coupled between the quarter-wave plate and the linear polarizer. Optionally, the quarter-wave plate is optically coupled between the objective lens and the polarization beam splitter.

Optionally, the structured-light imaging arrangement further comprises: a first optical assembly optically coupled between a light source and the optical meta-device of the structured-light imaging arrangement; and a second optical assembly optically coupled with the optical meta-device of the structured-light imaging arrangement and the image acquisition device. The second optical assembly is operable to guide (or process) and provide the structured-light to the target scene, and to receive or process light reflected from the target scene as a result of the light provided to the target scene. Optionally, the structured-light imaging arrangement further comprises the light source. The light source may be, e.g., a laser source, a visible light light source, etc. The laser source may provide single wavelength laser or multi-wavelength laser. The visible light light source is operable to provide visible light (at least part of the visible spectrum, e.g., colored light, white light, etc.).

Optionally, the first optical assembly of the structured-light imaging arrangement comprises: a polarization manipulation assembly, and a beam splitter optically coupled between the polarization manipulation assembly and the optical meta-device of the structured-light imaging arrangement. Optionally, the polarization manipulation assembly comprises a quarter-wave plate and a linear polarizer. The linear polarizer may be, e.g., a horizontal linear polarizer. Optionally, the linear polarizer is optically coupled between the quarter-wave plate and the beam splitter. Optionally, the first optical assembly of the structured-light imaging arrangement further comprises: one or more lens optically coupled with the light source; and a reflector optically coupled between the one or more lens and the polarization manipulation assembly. The reflector may be, e.g., a mirror, a prism, etc.

Optionally, the second optical assembly of the structured-light imaging arrangement comprises: an objective lens; a polarization manipulation assembly optically coupled with the objective lens; a polarization beam splitter optically coupled with the polarization manipulation assembly (and arranged/to be arranged between the target scene and the polarization manipulation assembly), and operable to guide and provide light to and receive reflected light from the target scene; and an optical sub-assembly optically coupled between the polarization beam splitter and the image acquisition device to guide (or process) and provide the reflected light received from the target scene to the image acquisition device. Optionally, the polarization manipulation assembly comprises: a quarter-wave plate and a linear polarizer that are optically coupled. The linear polarizer may be, e.g., a horizontal linear polarizer. Optionally, the linear polarizer is optically coupled between the quarter-wave plate and the polarization beam splitter. Optionally, the quarter-wave plate is optically coupled between the objective lens and the linear polarizer. Optionally, the optical sub-assembly comprises a linear polarizer optically coupled between the polarization beam splitter and the image acquisition device. Optionally, the optical sub-assembly further comprises a further polarization beam splitter optically coupled with the linear polarizer. The linear polarizer of the optical sub-assembly may be, e.g., a vertical linear polarizer. Optionally, the linear polarizer of the optical sub-assembly is optically coupled between the further polarization beam splitter and the image acquisition device. Optionally, the further polarization beam splitter is optically coupled between the polarization beam splitter and the image acquisition device. Optionally, the optical sub-assembly further comprises: an optical guide assembly for guiding light from the polarization beam splitter to the further polarization beam splitter. Optionally, the optical guide assembly comprises: a first reflector; a second reflector; and an objective lens assembly optically coupled between the first and second reflectors. The first reflector is operable to reflect light from the polarization beam splitter to the second reflector via the objective lens assembly. The second reflector is operable to reflect light from the objective lens assembly to the further polarization beam splitter. Optionally, the objective lens assembly comprises first and second objective lens. The first and second lens may have the same numerical aperture and/or magnification. Or the first and second lens may not have the same numerical aperture and/or magnification. The first reflector may be, e.g., a mirror, a prism, etc. The second reflector may be, e.g., a mirror, a prism, etc.

Optionally, the polarization beam splitter of the first optical assembly of the light-field imaging arrangement is the polarization beam splitter of the second optical assembly of the structured-light imaging arrangement. That is, the same, single polarization beam splitter is used as the polarization beam splitter of the first optical assembly of the light-field imaging arrangement and the polarization beam splitter of the second optical assembly of the structured-light imaging arrangement.

Optionally, the polarization manipulation assembly of the first optical assembly of the light-field imaging arrangement is the polarization manipulation assembly of the second optical assembly of the structured-light imaging arrangement. That is, the same, single polarization manipulation assembly is used as the polarization manipulation assembly of the first optical assembly of the light-field imaging arrangement and the polarization manipulation assembly of the second optical assembly of the structured-light imaging arrangement.

Optionally, the beam splitter of the second optical assembly of the light-field imaging arrangement is the beam splitter of the first optical assembly of the structured-light imaging arrangement. That is, the same, single beam splitter is used as the beam splitter of the second optical assembly of the light-field imaging arrangement and the beam splitter of the first optical assembly of the structured-light imaging arrangement.

Optionally, the polarization beam splitter of the second optical assembly of the light-field imaging arrangement is the further polarization beam splitter of the second optical assembly of the structured-light imaging arrangement. That is, the same, single polarization beam splitter is used as the polarization beam splitter of the second optical assembly of the light-field imaging arrangement and the further polarization beam splitter of the second optical assembly of the structured-light imaging arrangement.

Optionally, the imaging system further comprises a movement mechanism for causing relative movement between the image acquisition device and the optical meta-device of the light-field imaging arrangement and/or causing relative movement between the image acquisition device and the optical meta-device of the structured-light imaging arrangement.

Optionally, the image acquisition device comprises a camera.

Optionally, the imaging system further comprises a sensor operable to detect light in an environment in which the image acquisition device and/or the target scene is arranged; and a controller operably coupled with the sensor to control operation of the image acquisition device in the light-field imaging mode and/or the structured-light imaging mode based on the light detected by the sensor. Optionally, the controller is operable to operate or facilitate operation of the image acquisition device in the light-field imaging mode when an amount of light detected by the sensor (e.g., at an instant or over a period of time) is at or above a first threshold. Optionally, the controller is operable to operate or facilitate operation of the image acquisition device in the structured-light imaging mode when an amount of light detected by the sensor (e.g., at an instant or over a period of time) is at or below a second threshold. The first and second thresholds may be the same or different. Optionally, the controller is operable to operate or facilitate operation of the image acquisition device in the light-field imaging mode based on one or more properties of light (e.g., intensity, color, spectrum, duration, etc.) detected by the sensor. Optionally, the controller is operable to operate or facilitate operation of the image acquisition device in the structured-light imaging mode based on one or more properties of light (e.g., intensity, color, spectrum, duration, etc.) detected by the sensor.

Optionally, the transition from the light-field imaging mode to the structured-light imaging mode may include change in operation of one or more optical components (e.g., turning on the light source, changing/moving objective len(es), changing/moving linear polarizer(s), etc.). Optionally, the transition from the structured-light imaging mode to the light-field imaging mode may include change in operation of one or more optical components (e.g., turning off the light source, changing/moving objective len(es), changing/moving linear polarizer(s), etc.).

Optionally, the imaging system further comprises a user-actuatable mode selector for selecting operation mode of the imaging system, the operation mode including, at least, the light-field imaging mode and the structured-light imaging mode; and a controller operably coupled with the user-actuatable mode selector to control operation of the image acquisition device in the selected operation mode.

In a fourth aspect, there is provided a data processing system with one or more processors arranged or programmed to: process the light-field image of the target scene obtained by the imaging system of the third aspect using a first machine learning based model to determine depth information associated with the target scene or one or more objects in the target scene and/or to process the structured-light image of the target scene obtained by the imaging system of the third aspect using a second machine learning based model to determine depth information associated with the target scene or one or more objects in the target scene. The first and second machine learning based models are different. The first machine learning based model may include, e.g., a convolution neural network. The second machine learning based model may include, e.g., a convolution neural network. The data processing system may be, e.g., operably connected with the imaging system of the third aspect. In some examples, the data processing system may be arranged separately or remote from the imaging system of the third aspect. In some examples, the data processing system may be integrated with the imaging system of the third aspect. In some examples, part of the data processing system may be integrated with the imaging system of the third aspect.

In a fifth aspect, there is provided an imaging system comprising: an image acquisition device and a light-field imaging arrangement including an optical meta-device operable to facilitate imaging of a light-field of a target scene. The light-field imaging arrangement is optically coupled with the image acquisition device such that the imaging system is operable in, at least, a light-field imaging mode for performing light-field imaging of the target scene.

Optionally, the optical meta-device comprises a meta-lens array.

Optionally, the meta-lens array comprises or consist of a plurality of achromatic meta-lenses.

Optionally, the light-field imaging arrangement further includes: a lens arranged to receive light-field associated with the target scene; a first optical assembly optically coupled between the lens and the optical meta-device; and a second optical assembly optically coupled between the optical meta-device and the image acquisition device. The first optical assembly, the optical meta-device, and the second optical assembly are arranged to process the received light-field for imaging by the image acquisition device.

Optionally, the first optical assembly comprises: a polarization beam splitter; a polarization manipulation assembly optically coupled with the polarization beam splitter; and an objective lens optically coupled with the polarization manipulation assembly. Optionally, the polarization manipulation assembly comprises: a quarter-wave plate and a linear polarizer that are optically coupled. The linear polarizer may be, e.g., a horizontal linear polarizer. Optionally, the linear polarizer is optically coupled between the quarter-wave plate and the polarization beam splitter. Optionally, the polarization beam splitter is optically coupled between the lens and the linear polarizer. Optionally, the quarter-wave plate is optically coupled between the linear polarizer and the objective lens.

Optionally, the second optical assembly comprises: an objective lens; and a polarization manipulation assembly optically coupled between the objective lens and the image acquisition device. Optionally, the second optical assembly further comprises a beam splitter optically coupled between the optical meta-device and the objective lens. Optionally, the polarization manipulation assembly comprises: a quarter-wave plate, a polarization beam splitter, and a linear polarizer that are optically coupled. The linear polarizer may be, e.g., a horizontal linear polarizer. Optionally, the linear polarizer is optically coupled between the polarization beam splitter and the image acquisition device. Optionally, the polarization beam splitter is optically coupled between the quarter-wave plate and the linear polarizer. Optionally, the quarter-wave plate is optically coupled between the objective lens and the polarization beam splitter.

Optionally, the imaging system further comprises a movement mechanism for causing relative movement between the image acquisition device and the optical meta-device.

Optionally, the image acquisition device comprises a camera.

In a sixth aspect, there is provided a data processing system comprising one or more processors arranged or programmed to process the light-field image of the target scene obtained by the imaging system of fifth aspect using a machine learning based model to determine depth information associated with the target scene or one or more objects in the target scene. The machine learning based model may include, e.g., a convolution neural network. The data processing system may be, e.g., operably connected with the imaging system of the fifth aspect. In some examples, the data processing system may be arranged separately or remote from the imaging system of the fifth aspect. In some examples, the data processing system may be integrated with the imaging system of the fifth aspect. In some examples, part of the data processing system may be integrated with the imaging system of the fifth aspect.

In a seventh aspect, there is provided an imaging system comprising: an image acquisition device; and a structured-light imaging arrangement including an optical meta-device operable to facilitate generation of structured-light to be provided to a target scene to facilitate imaging of the target scene. The structured-light imaging arrangement are optically coupled with the image acquisition device such that the imaging system operable in, at least, a structured-light imaging mode for performing structured-light imaging of the target scene.

Optionally, the optical meta-device comprises a meta-lens array.

Optionally, the meta-lens array comprises or consist of a plurality of achromatic meta-lenses.

Optionally, the structured-light imaging arrangement further comprises: a light source; a first optical assembly optically coupled between the light source and the optical meta-device; and a second optical assembly optically coupled with the optical meta-device and the image acquisition device. The second optical assembly is operable to guide (or process) and provide the structured- to the target scene and to receive (guide or process) light reflected from the target scene as a result of the light provided to the target scene.

Optionally, the light source comprises a laser source, e.g., a single wavelength or multi-wavelength laser source. Optionally, the light source comprises a visible light light source operable to provide visible light (at least part of the visible spectrum, e.g., colored light, white light, etc.).

Optionally, the first optical assembly comprises: a polarization manipulation assembly; and a beam splitter optically coupled between the polarization manipulation assembly and the optical meta-device. Optionally, the polarization manipulation assembly comprises a quarter-wave plate and a linear polarizer. The linear polarizer may be, e.g., a horizontal linear polarizer. Optionally, the linear polarizer is optically coupled between the quarter-wave plate and the light source. Optionally, the first optical assembly further comprises: one or more lens optically coupled with the light source; and a reflector optically coupled between the one or more lens and the polarization manipulation assembly (e.g., the linear polarizer). The reflector may be, e.g., a mirror, a prism, etc.

Optionally, the second optical assembly comprises: an objective lens; a polarization manipulation assembly optically coupled with the objective lens; a polarization beam splitter optically coupled with the polarization manipulation assembly (and arranged/to be arranged between the target scene and the polarization manipulation assembly), and operable to guide and provide light to and receive reflected light from the target scene; and an optical sub-assembly optically coupled between the polarization beam splitter and the image acquisition device to guide (or process) and provide the reflected light received from the target scene to the image acquisition device. Optionally, the polarization manipulation assembly comprises: a quarter-wave plate and a linear polarizer that are optically coupled. The linear polarizer may be, e.g., a horizontal linear polarizer. Optionally, the linear polarizer is optically coupled between the quarter-wave plate and the polarization beam splitter. Optionally, the quarter-wave plate is optically coupled between the objective lens and the linear polarizer. Optionally, the optical sub-assembly comprises: a linear polarizer optically coupled between the polarization beam splitter and the image acquisition device. Optionally, the optical sub-assembly further comprises a further polarization beam splitter optically coupled with the linear polarizer. Optionally, the linear polarizer of the optical sub-assembly may be a vertical linear polarizer. Optionally, the linear polarizer of the optical sub-assembly is optically coupled between the further polarization beam splitter and the image acquisition device. Optionally, the further polarization beam splitter is optically coupled between the polarization beam splitter and the image acquisition device.

Optionally, the optical sub-assembly further comprises: an optical guide assembly for guiding light from the polarization beam splitter to the further polarization beam splitter.

Optionally, the optical guide assembly comprises: a first reflector; a second reflector; and an objective lens assembly optically coupled between the first and second reflectors. The first reflector is operable to reflect light from the polarization beam splitter to the second reflector via the objective lens assembly. The second reflector is operable to reflect light from the objective lens assembly to the further polarization beam splitter. The first reflector may be, e.g., a mirror, a prism, etc. The second reflector may be, e.g., a mirror, a prism, etc.

Optionally, the imaging system further comprising a movement mechanism for causing relative movement between the image acquisition device and the optical meta-device.

Optionally, the image acquisition device comprises a camera.

In an eighth aspect, there is provided a data processing system comprising one or more processors arranged or programmed to: process the structured-light image of the target scene obtained by the imaging system of the seventh aspect using a machine learning based model to determine depth information associated with the target scene or one or more objects in the target scene. The machine learning based model may include, e.g., a convolution neural network. The data processing system may be, e.g., operably connected with the imaging system of the seventh aspect. In some examples, the data processing system may be arranged separately or remote from the imaging system of the seventh aspect. In some examples, the data processing system may be integrated with the imaging system of the seventh aspect. In some examples, part of the data processing system may be integrated with the imaging system of the seventh aspect.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that "generally", "about", "substantially", or the like, are used, depending on context, to account for manufacture tolerance, degradation, trend, tendency, practical applications, etc. In one example, when a value is modified by terms of degree, such as "about", such expression includes the stated value ±15%, ±10%, ±5%, ±2%, or ±1%.

Unless otherwise specified, the terms "connected", "coupled", "mounted" or the like, are intended to encompass both direct and indirect connection, coupling, mounting, etc. The term "optically coupled" may include direct and indirect optical coupling. An example of optical coupling is optical alignment (e.g., aligned in a common light path).

BRIEF DESCRIPTION OF THE DRAWINGS

Embodiments of the invention will now be described, by way of example, with reference to the accompanying drawings in which:

FIG. 25 is a schematic diagram illustrating a network architecture of the CNN-based model of FIG. 19 in one embodiment of the invention;

FIG. 29 is a high-level block diagram of a light-field imaging system in some embodiments of the invention;

FIG. 30 is a high-level block diagram of a structured-light imaging system in some embodiments of the invention;

FIG. 31 is a high-level block diagram of an imaging system in some embodiments of the invention; and FIG. 32 is a block diagram of a data processing system in some embodiments of the invention.

DETAILED DESCRIPTION

Figure 1:
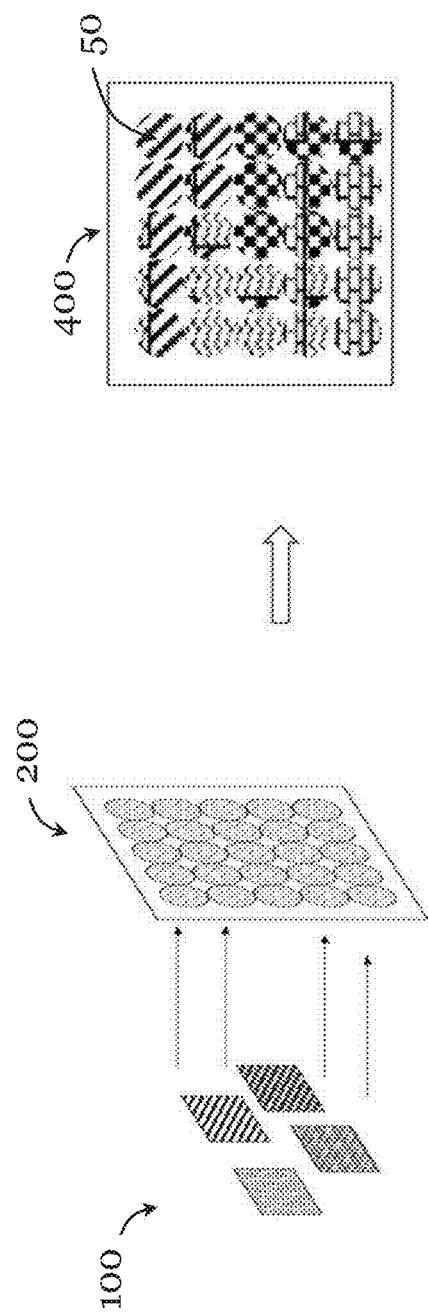
FIG. 1 is a schematic diagram illustrating operation principle of a light-field imaging system of a compound optical system in one embodiment of the invention.

Inventors of the present invention have devised, through their research, that optical illusion can typically be divided into two types. One type relates to two dimensional (2D) image deliberately created or arranged to appear three dimensional (3D). One example is the Penrose stairs (also called magic stairs or impossible stairs). Another type is 3D object appearing to be 2D when viewed from certain angle(s). One example can be obtained by imaging a spiral staircase from a specific angle, and the optical illusion is created because the image acquired is 2D (i.e., with one dimension of information, depth information, missing in the information acquisition process). In some applications, errors in or lack of depth perception of a scene (or object(s)) can cause problems. Inventors of the present invention have devised, through their research, that optical depth perception system can be used to establish stereo vision of a scene to obtain the depth information, and that optical systems that can image and/or detect depth accurately are useful in various applications.

Inventors of the present invention have further devised, through their research, that there exist various techniques for obtaining depth information of a scene, and these techniques all have their advantages and disadvantages in accordance with their operation principles. Inventors of the present invention have appreciated that these techniques can be divided into passive depth detection techniques and active depth detection techniques.

In passive depth detection techniques, depth information is collected from ambient light (and additional light sources is generally not required) and these techniques may suffer from performance issues in no or low light conditions. One example passive depth detection technique uses binocular stereo vision system (with a pair of cameras). For binocular systems, the sampling density of the depth map can be determined by the resolution of the imaging sensor, and both full-color images and depth information could be achieved accordingly. However, binocular camera usually require complex stereo matching algorithms that is computational-resource intensive. Also, the binocular camera may not be effective for imaging depth of some scenes such as low-texture scenes (with object(s)). One other example passive depth detection technique uses light-field cameras, which have more lenses than binocular cameras. Light-field cameras generally have higher angular resolution and more accurate depth sensing, but they too may not satisfactorily perform depth imaging for low-texture scenes.

On the other hand, active depth detection techniques are generally reliable and are generally independent of the texture of the scene, especially in low or no light conditions. However, the performance of these techniques may be degraded under normal or strong light conditions. One example active depth detection technique uses depth camera based on structured-light, which can usually be used in scenes with low texture and no or low light conditions. However, for depth camera based on structured-light, the depth mapping is relatively noisy under normal or strong light conditions (e.g., outdoors).

Inventors of the present invention have realized that depth imaging system that has low power consumption, small footprint, lightweight, and/or of relatively simple structure would be useful, and metasurface nanophotonics may further improve depth or range sensing technology. Inventors of the present invention have devised, through their research, that metasurface is a generally flat optics component that includes subwavelength structures that can manipulate phase, polarization, and/or amplitude of light. The incoming electromagnetic wave properties can be engineered across the optical band and the communication band. Meta-lens is one of the metasurfaces that can focus light and be used in imaging, and it can be designed and customized for specific applications. By structural design and material selection, the special beam shaping, achromatic focusing, and/or wide-angle properties of meta-lenses can be realized to improve practical usability of optical systems. Inventors of the present invention have devised, through their research, that for depth sensing, existing techniques based on meta-lens to compute the depth via point spread function (PSF) show limited accuracy and depth-sensing range and could not perform full-color imaging. Inventors of the present invention have discovered that achromatic meta-lens, by considering focusing phase and phase compensation of visible light, can enable full-color imaging through one layer of nanostructures with several hundred nanometers thickness. Compared to traditional lens with a compound lens set, chromatic aberration elimination by achromatic meta-lens has various advantages such as being thin, compact, enable multiplexing, and/or can be easily integrated to devices. Inventors of the present invention have realized that light-field imaging and depth measurement techniques using meta-lens array may achieve diffraction-limited resolution, but the limited interaction cross-section of the nanoantennas can provide finite total transmission efficiency of the meta-lenses array, which means that depth detection under the low or no light level is relatively difficult.

Based on, or motivated by, the above, inventors of the invention have developed various imaging systems and depth sensing systems, which are part of this invention. In some embodiments, there is provided a structured-light imaging device. In some embodiments, there is provided a light-field imaging device. In some embodiments, there is provided a depth-sensing and imaging system, or a compound optical system, that integrates light-field imaging and active structured-light projection/imaging by using an achromatic meta-lens array optical device.

Figure 2:
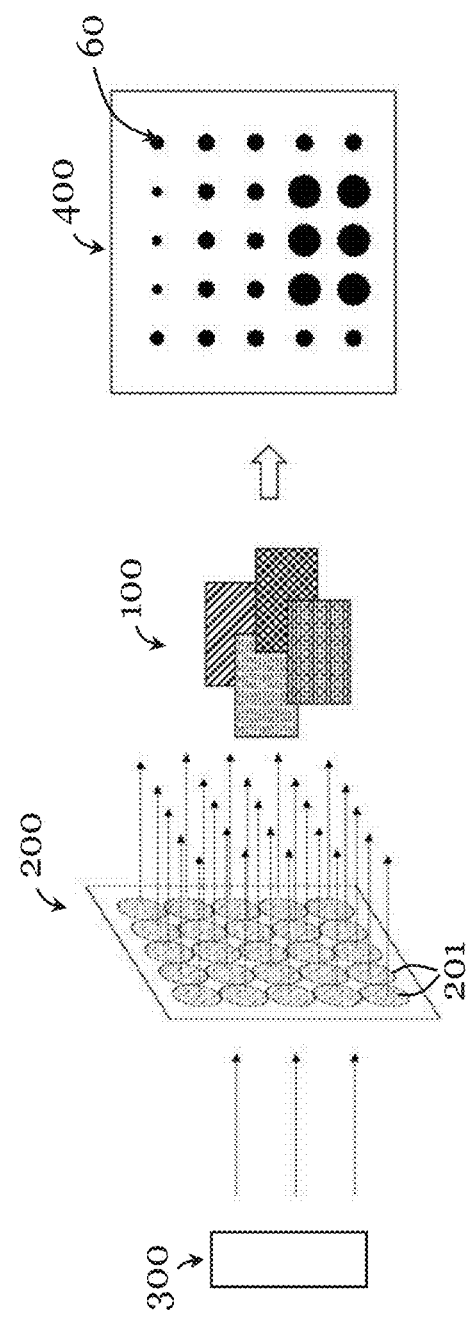
FIG. 2 is a schematic diagram illustrating operation principle of a structured-light projection (imaging) system of a compound optical system in one embodiment of the invention.

FIGS. 1 and 2 illustrate operation principle of a compound optical system in one embodiment of the invention. The system includes a meta-lens array 200, a laser source 300, and an image acquisition device 400.

Figure 5B:
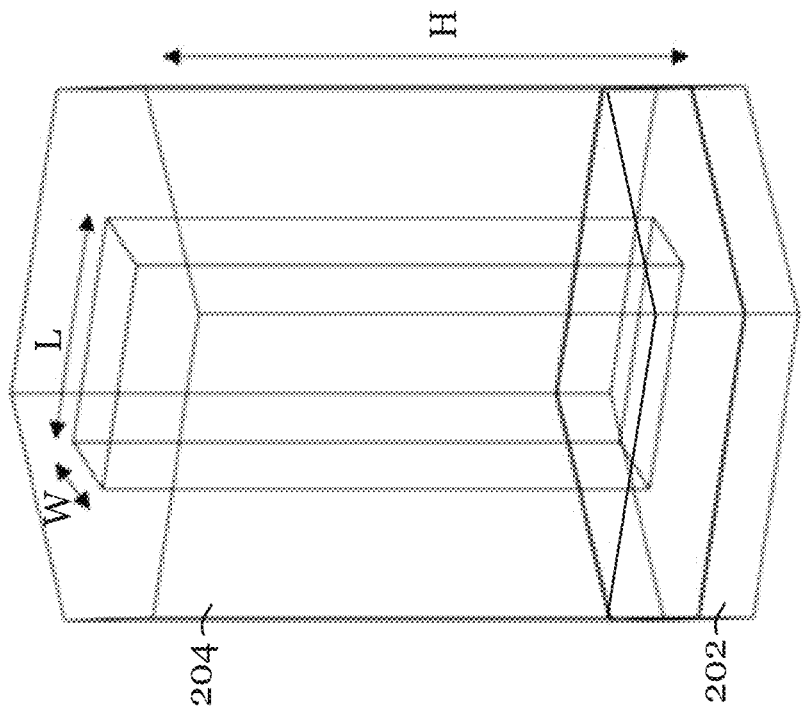
FIG. 5B is a schematic diagram illustrating another gallium nitride (GaN) based nanostructure in a meta-lens in one embodiment of the invention.
Figure 5A:
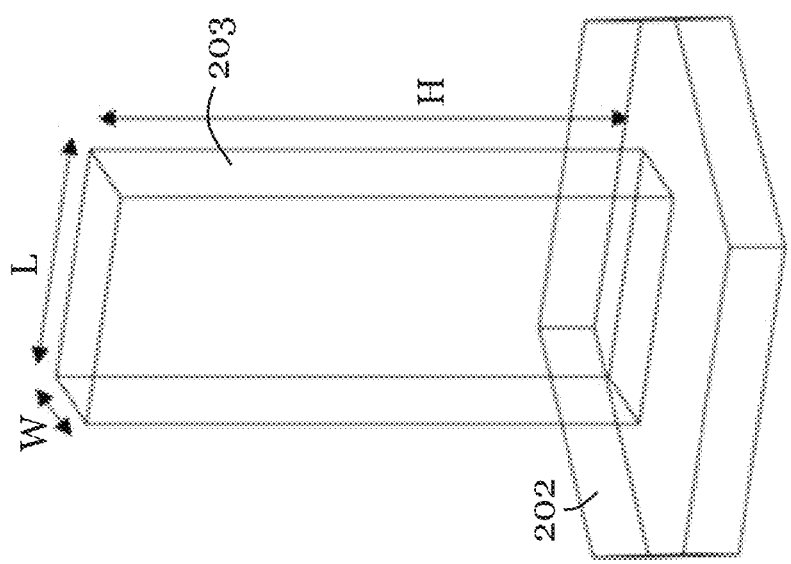
FIG. 5A is a schematic diagram illustrating a gallium nitride (GaN) based nanostructure in a meta-lens in one embodiment of the invention.

In this embodiment the meta-lens array 200 includes multiple meta-lenses 201 arranged in an array. Each of the meta-lenses 201 is provided by arranging an array of nanoantennas (FIGS. 5A and 5B) on the substrate 202. As shown in FIGS. 5A and 5B, the nanoantenna array includes multiple solid nanostructures 203 and multiple inverse (hollow) nanostructures 204. The solid nanostructures 203 and the inverse nanostructures 204 are arranged in an array on the substrate 202. Each nanoantenna array can manipulate the amplitude, phase, and polarization of the incident light to perform broadband achromatic focusing.

When a light intensity is larger than a predetermined light intensity, the laser source 300 is an OFF state and the compound optical system forms a light-field imaging system. Reflected light of the target scene 100 forms a scene image 50 on the image acquisition device 400 through the meta-lens array 200. Imaging requirements including spherical aberration and broadband achromatic function can be realized using the broadband achromatic focusing function of the meta-lens array 200, without the need to configure or arrange additional lens(es).

When a light intensity is smaller than a predetermined light intensity, the laser source 300 is an ON state and the compound optical system forms a structured-light projection system. A laser beam emitted by the laser source 300 transmits through the meta-lens array 200 and projects to the target scene 100 to form a light spot array (an array of light spots). The light spot array is reflected to the image acquisition device 400 to form a light spot array image 60. Based on the shape and size of the light spots as well as the distance between the light spots in the light spot array image 60, depth information of the target scene 100 can be processed and generated, without being limited by lighting conditions and texture level of the target scene 100. In some other embodiments, the laser source 300 can be replaced with a visible light light source.

In this embodiment, the phase distribution function of the meta-lens 201 satisfies the following equation:

$$\varphi(R, \lambda) = -\left[2\pi\left(\sqrt{R^2 + f^2}\right) - f\right]\frac{1}{\lambda}, \lambda \in \{\lambda_{min}, \lambda_{max}\}$$

where $\varphi(R, \lambda)$ is the phase distribution function of the meta-lens 201, R is the distance from any point on the meta-lens 201 to the geometric center of the meta-lens 201, $\lambda$ is the wavelength of the incident light, and f is the preset focal length of the meta-lens 201.

Phase distribution of the meta-lens 201 is related to the operation wavelength $\lambda$ and the distance R. Incident light of different wavelengths $\lambda$ will result in different phase distribution. The main phase related to $\lambda_{max}$ can be realized based on the Pancharatnam-Berry phase design principle. The required phase compensation between $\lambda_{max}$ and other operation wavelengths can be obtained by suitably designing the dimension(s) of the nanoantenna structure. Based on the above phase distribution function, data related to size of the nanostructures in the nanoantenna array that meets the requirement can be obtained from a nanoantenna database, and the meta-lens can be constructed based on the data of the size(s) of the corresponding nanostructures. Data in the nanoantenna database can be calculated, organized, and collected using simulation software.

As shown in FIGS. 5A and 5B, using the solid nanostructure and the inverse nanostructure made from gallium oxide (GaN) as example, when His 800 nm, the relationship between the length L and width W of the nanostructures 203, 204 and the provided phase compensation is shown in the Table 1 below. The relationship/values provided in the Table can be used to satisfy phase requirements for achromatic focusing at wavelengths from 400 nm to 660 nm. It should be appreciated that the data provided in the Table is merely an example, and it is not intended to limit the meta-lens of the invention to these values.

TABLE 1

| Type | L (nm) | W (nm) | Provided phase compensation (degrees) |
|---|---|---|---|
| Solid nanostructure (FIG. 5A) | 80 | 45 | 660 |
| | 95 | 50 | 690 |
| | 115 | 50 | 720 |
| | 125 | 55 | 750 |
| | 130 | 60 | 780 |
| | 135 | 65 | 810 |
| | 135 | 70 | 840 |
| | 140 | 75 | 870 |
| | 140 | 80 | 900 |
| | 145 | 85 | 930 |
| | 150 | 90 | 960 |
| | 155 | 95 | 990 |
| | 165 | 100 | 1020 |
| | 165 | 110 | 1050 |
| Inverse nanostructure (FIG. 5B) | 163 | 80 | 1080 |
| | 140 | 60 | 1110 |
| | 125 | 50 | 1140 |

Figure 3:
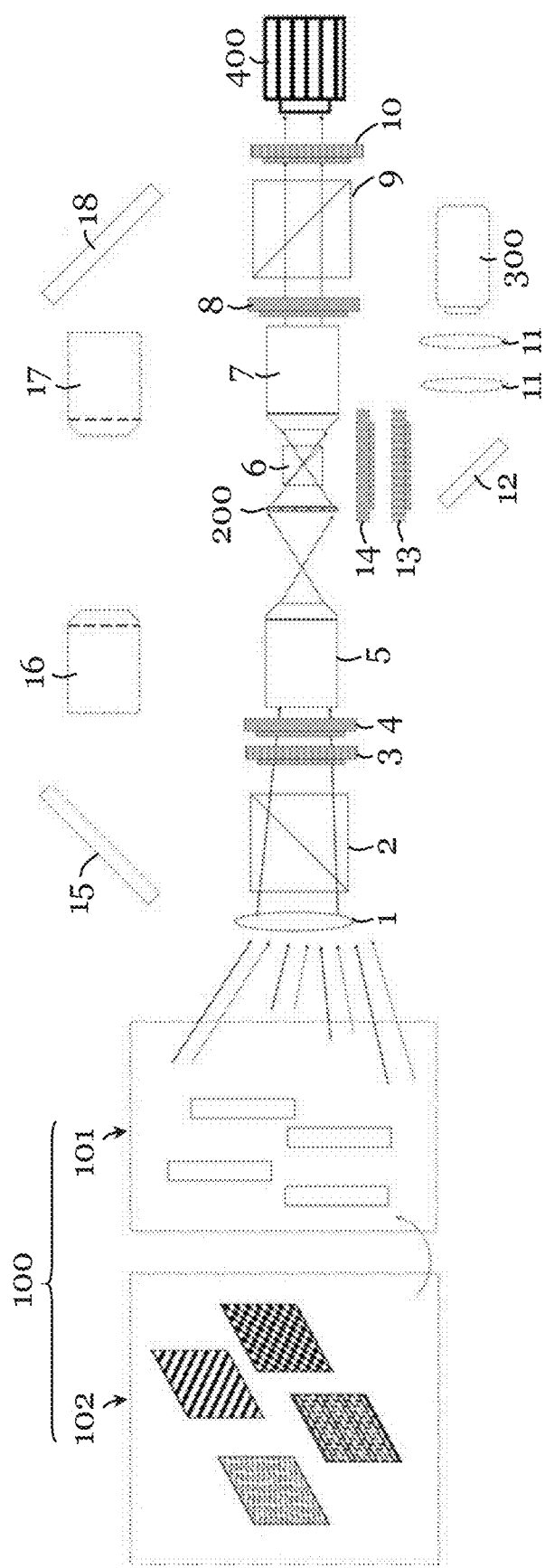
FIG. 3 a schematic diagram illustrating an optical path in a light-field imaging system provided by a compound optical system in one embodiment of the invention.
Figure 4:
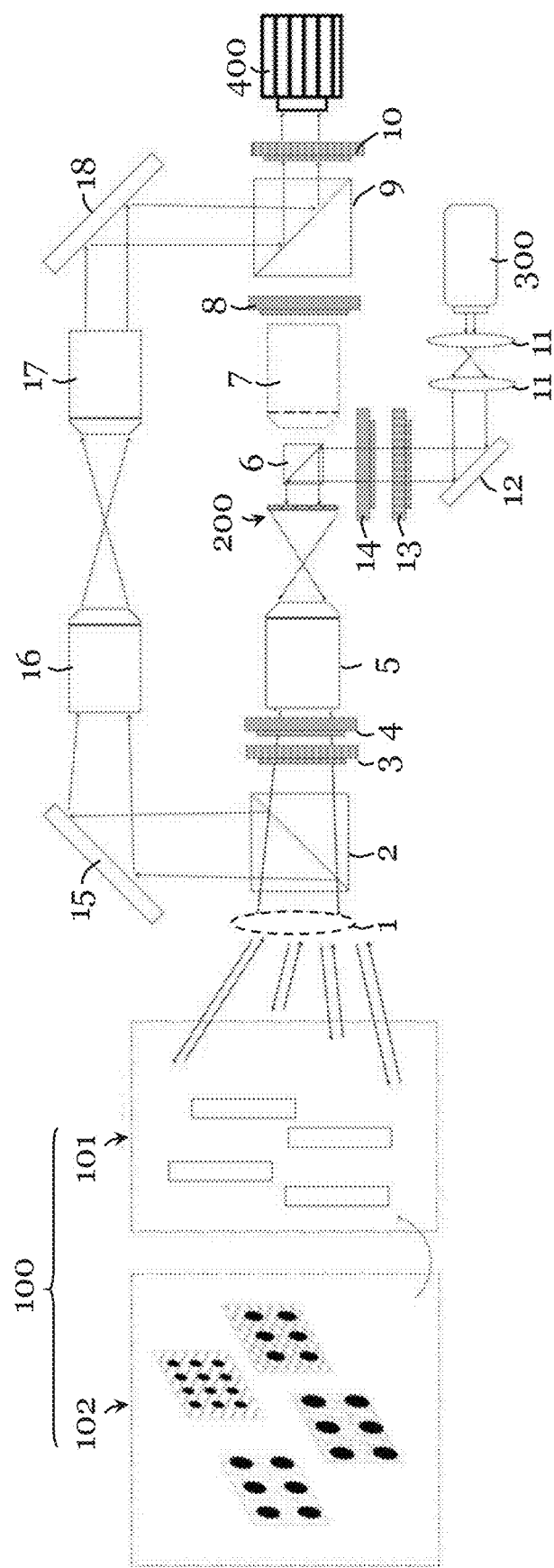
FIG. 4 is a schematic diagram illustrating an optical path in a structured-light projection system provided by a compound optical system in one embodiment of the invention.

FIGS. 3 and 4 illustrate the top view 101 and perspective view 102 of the same target scene to better illustrate the target scene 100. In this embodiment, the compound optical system includes a first quarter-wave plate 4, a first linear polarizer 3, and a first polarization beam splitter 2. The first polarization beam splitter 2, the first linear polarizer 3, and the first quarter-wave plate 4 are sequentially arranged between the target scene 100 and the meta-lens array 200 (from the target scene 100 to the meta-lens array 200). The compound optical system also includes an (optical) receiver lens 1 arranged between the first polarization beam splitter 2 and the target scene 100. The reflected light of the target scene 100 in the light-field imaging system forms a reflected light beam through the receiver lens 1.

Referring to FIG. 3, in the light-field imaging system (optical components shown in dotted lines are blocked or otherwise disabled such that they are not optically operated in the light-field imaging system), the first polarization beam splitter 2 is used in the light-field imaging system for performing guiding in the incident light path of the meta-lens array 200 in the light-field imaging system. In other words, the reflected light beam of the target scene 100 is split by the first polarization beam splitter 2 into a horizontal linearly polarized light beam and a vertical linearly polarized light beam. The horizontal linearly polarized light beam projects toward the meta-lens array 200. The first linear polarizer 3 and the first quarter-wave plate 4 cooperate to perform filtering in the incident light path of the meta-lens array 200 in the light-field imaging system. In other words, the horizontal linearly polarized light beam (provided by the first polarization beam splitter 2) passes through the first linear polarizer 3 and the first quarter-wave plate 4 sequentially and then converts into the required polarized light beam, which is then projected to the meta-lens array 200.

Referring to FIG. 4, in the structured-light projection/imaging system (optical components shown in dotted lines are blocked or otherwise disabled such that they are not optically operated in the structured-light projection system), the first linear polarizer 3 and the first quarter-wave plate 4 cooperate to perform filtering in the emerging (outgoing) light path of the meta-lens array 200 in the structured-light projection system. In other words, laser beam emitted by the laser source 300 passes through the meta-lens array 200 and passes through the first linear polarizer 3 and the first quarter-wave plate 4 to convert into the required polarized light beam. The first polarization beam splitter 2 is used for performing guiding in the emerging light path of the meta-lens array 200 in the light-field imaging system. In other words, the first polarization beam splitter 2 splits the polarized light beam projected by the first linear polarizer 3 into a horizontal linearly polarized light beam and a vertical linearly polarized light beam. The horizontal linearly polarized light beam projects toward the target scene 100.

As shown in FIGS. 3 and 4, a first objective lens 5 is arranged between the meta-lens array 200 and the first quarter-wave plate 4 to improve quality of the optical path. Specifically, in this example, the first objective lens 5 has a numerical aperture of 0.21 and provides a 7.5× magnification.

As shown in FIGS. 3 and 4, the compound optical system also includes a beam splitter 6 arranged between the meta-lens array 200 and the image acquisition device 400. The compound optical system also includes a second linear polarizer 10 and a second polarization beam splitter 9. The second polarization beam splitter 9 and the second linear polarizer 10 are sequentially arranged between the beam splitter 6 and the image acquisition device 400. A second quarter-wave plate 8 is arranged between the beam splitter 6 and the second polarization beam splitter 9.

As shown in FIG. 3, in the light-field imaging system, the beam splitter 6 is used in the emerging (outgoing) light path of the meta-lens array 200 in the light-field imaging system. The second quarter-wave plate 8 and the second linear polarizer 10 cooperate to perform filtering in the incident light path of the image acquisition device 400 in the light-field imaging system. The beam splitter 6 splits the emerging (outgoing) light beam of the meta-lens array 200 into a horizontal light beam and a vertical light beam. The horizontal light beam is first filtered by the second quarter-wave plate 8 into a linearly polarized light beam, which is then split by the second polarization beam splitter 9 into a horizontal linearly polarized light beam and a vertical linearly polarized light beam. The horizontal linearly polarized light beam is filtered by the second linear polarizer 10 to become the required polarized light beam, which is then projected to the image acquisition device 400.

In this embodiment, a second objective lens 7 is arranged between the beam splitter 6 and the second quarter-wave plate 8. In this example, the second objective lens 7 has a numerical aperture of 0.4 and provides a 20× magnification.

As shown in FIG. 4, in this embodiment, the compound optical system further includes a first reflector 12 for reflecting the emerging (outgoing) light path of the laser source 300 to the beam splitter 6. The compound optical system further includes a third quarter-wave plate 14 and a third linear polarizer 13. The third linear polarizer 13 and the third quarter-wave plate 14 are sequentially arranged between the laser source 300 and the beam splitter 6. Furthermore, two shaping lens 11 are arranged between the first reflector 12 and the laser source 300, for shaping the laser beam emitted by the laser source 300.

As shown in FIG. 4, in the structured-light projection system, the beam splitter 6 is used for performing guiding in the incident light path of the meta-lens array 200 in the structured-light projection system. The third linear polarizer 13 and the third quarter-wave plate 14 cooperate to perform filtering in the emerging light path of the laser source 300. The first reflector 12 is arranged at an intersection of the optical axes of the beam splitter 6 and the laser source 300. The laser beam emitted by the laser source 300 is reflected by the first reflector 12, then is sequentially filtered by the third linear polarizer 13 and the third quarter-wave plate 14 to provide the required polarized light beam. The polarized light beam is then split by the beam splitter 6 into a horizontal light beam and a vertical light beam. The vertical light beam projects to the meta-lens array 200.

As shown in FIG. 4, the compound optical system further includes a second reflector 15 and a third reflector 18. The second reflector 15 and the third reflector 18 cooperate to guide the emerging light path from the first polarization beam splitter 2 to the second polarization beam splitter 9. Specifically, the second reflector 15 is arranged at the intersection of the optical axes of the first polarization beam splitter 2 and the third reflector 18. The third reflector 18 is arranged at the intersection of the optical axes of the second reflector 15 and the second polarization beam splitter 9.

As shown in FIG. 4, in the structured-light projection system, the first polarization beam splitter 2 is used for performing guiding in the reflected light path of the light spot array. The reflected light beam of the light spot array is split by the first polarization beam splitter 2 into a horizontal linearly polarized light beam and a vertical linearly polarized light beam. The vertical linearly polarized light beam first projects towards the second reflector 15, then reflects from the second reflector 15 to the third reflector 18, and then reflects from the third reflector 18 to the second polarization beam splitter 9. The vertical linearly polarized light beam (provided by the first polarization beam splitter 2) projects to the second linear polarizer 10 through the second polarization beam splitter 9. The second linear polarizer 10 rotates by 90 degrees, such that the vertical linearly polarized light beam is filtered by the second linear polarizer 10 to become the required polarized light beam, which is projected to the image acquisition device 400.

As shown in FIG. 4, a third objective lens 16 and a fourth objective lens 17 are arranged between the second reflector 15 and the third reflector 18. Each of the third objective lens 16 and the fourth objective lens 17 has a numerical aperture of 0.2 and provides a lox magnification.

Referring to FIGS. 1 and 2, one embodiment of the invention also provides a depth detection system that includes the abovementioned compound optical system. The depth detection system further includes a data processing device. The data processing device is arranged to (1) process the scene image 50 obtained by the image acquisition device 400 in the light-field imaging system to generate depth information of the target scene 100, and (2) process the light spot array image 60 obtained by the image acquisition device 400 in the structured-light projection system to generate depth information of the target scene 100.

In one embodiment, the data processing device uses convolutional neural networks model to process the images obtained by the image acquisition device 400 in the light-field imaging system and the structured-light projection system. In one embodiment, the data processing device uses different convolutional neural networks to process images obtained by the image acquisition device 400 in the light-field imaging system and the structured-light projection system. The obtained images (of the light-field imaging system) are input into the convolutional neural network model that has been trained using training samples of scene images 50 (i.e., the light-field images) obtained using the compound optical system of the invention and corresponding depth information. The obtained images (of the structured-light projection system) are input into the convolutional neural network model that has been trained using training samples of light spot array images 60 (i.e., the structured-light images) obtained using the compound optical system of the invention and corresponding depth information. The compound optical system of some embodiments of the invention can provide the convolutional neural network models with high-dimensionality and high-resolution input information, thus enables the convolutional neural network models be trained to better suit specific applications. As a result, the depth detection system of the invention can, in practical applications, make use of the compound optical system and the trained convolutional neural network models to obtain more accurate and more complete depth information, with faster processing speed and less susceptibility to interference. Through the training process, the convolutional neural network models can learn the pattern of distribution of features in the images with the spatial depth represented in two-dimensional plane, such as aberration of the scene image 50 in the light-field imaging system and the size and shape of the light spots and the spacing between the spots in the light spot array image 60 in the structured-light projection system, respectively. The convolutional neural network models can directly process and generate a depth image corresponding to the target scene 100. In one embodiment, this entire process is automatically performed by the convolutional neural network models, without requiring parameter optimization (as in traditional algorithm, which is time-consuming), thereby enabling real-time processing of the images to enable real-time applications.

The image data obtained by the compound optical system of some embodiments of the invention is multi-dimensional high-resolution image data. In particular, the image data obtained by the light-field imaging system may include images captured by thousand(s) of lenses. This is different from conventional binocular stereo vision matching system powered by deep learning. The network architecture of the convolutional neural networks can be modified in different embodiments. The network architecture of the convolutional neural network can be designed based on the characteristics of the input information of the convolutional neural network models. The convolutional neural network models can also be modified to suit specific application. The number of meta-lenses 201 in the meta-lens array 200 can be modified.

Figure 6:
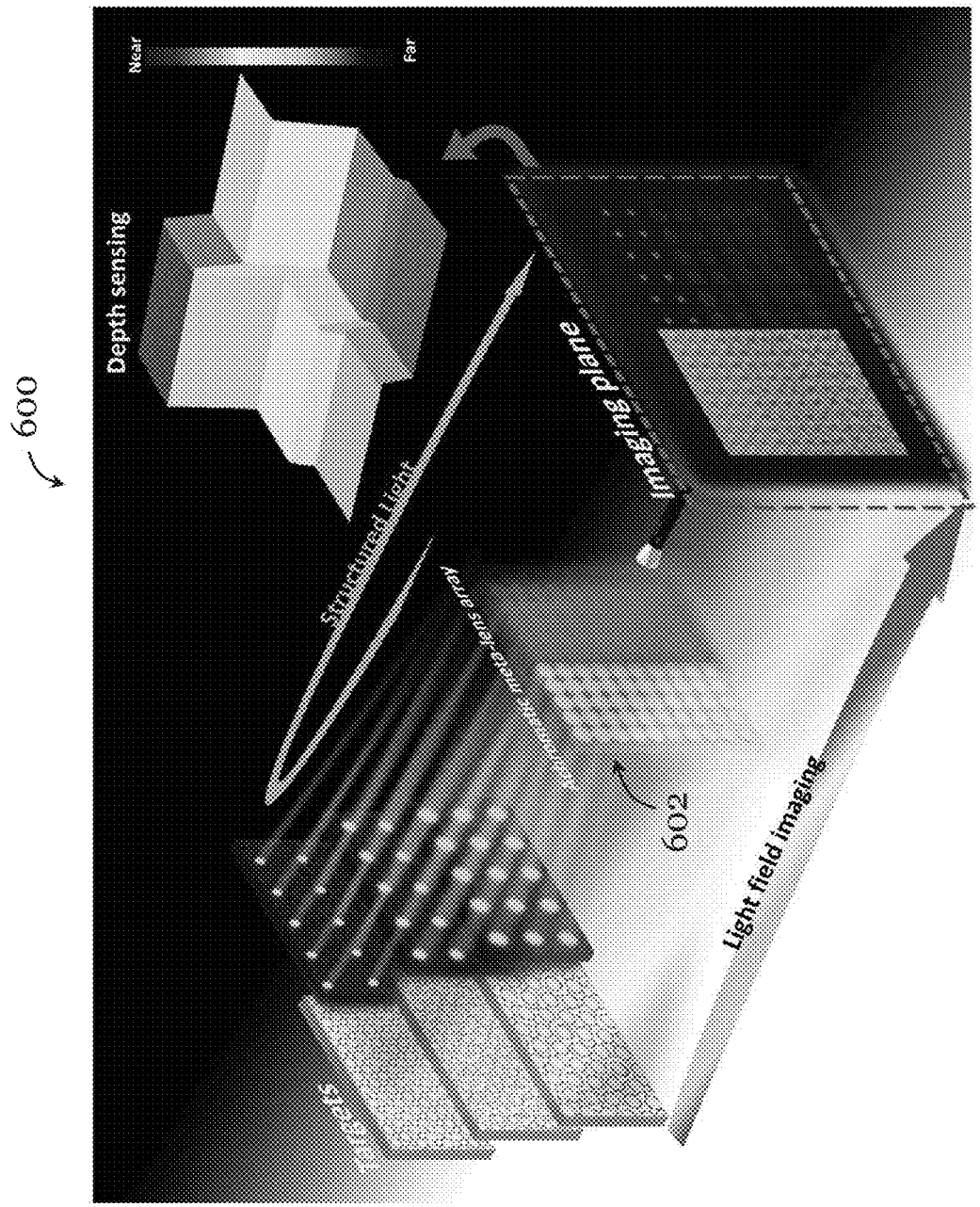
FIG. 6 is a schematic diagram illustrating operation principle of an imaging and depth sensing system in one embodiment of the invention.

FIG. 6 illustrates a general operation principle of an imaging and depth sensing system 600 in one embodiment. The system 600 includes an achromatic meta-lens array 602, and can operate selectively as a light-field imaging system and a structured-light imaging system. In this embodiment, the meta-lens array 602 is operable to selectively operate as an imaging component of a light-field imaging system and as a component of a structured-light imaging system to generate or facilitate generation of structured-light (e.g., array of light spots) to be provided to the scene for imaging the scene. If the ambient light or light from the scene (e.g., target object(s)) is strong enough, the multidimensional light-field information of objects can be collected via the achromatic meta-lens array 602 and captured at the imaging plane (e.g., of a camera). In FIG. 6, the forward-path (the "light-field imaging" arrow) represents the direction of the light ray from the side of the scene (or the object(s)). If ambient light or light from the target object is not strong enough (e.g., in low or no light conditions), the light-field imaging system may not be able to acquire sufficient photon flux for obtaining quality light-field image. In this case, the meta-lens array 602 operates as part of a structured-light imaging system. In the other path (the "structured-light" arrow), a light beam such as a laser beam is introduced and transmitted through the meta-lens array 602 to project a focused light spots array on the target scene/object(s). The shape of the focused light spots and the distance between the spots change with the depth of an object (or different parts of an object). The array of the light spots containing depth information can be acquired on the imaging plane (e.g., of a camera). The imaging and depth sensing system 600 integrates a multi-lenses light-field camera and an active structured-light imaging system for operation (imaging) at different light levels (e.g., intense light level, normal light level, low light level, or no light). The imaging and depth sensing system 600 can operate effectively on scene, object(s), background, etc., with or without textures.

In one embodiment, a meta-device in the form of a meta-lens array made of GaN with 3600 achromatic meta-lenses (in 1.2×1.2 mm²), which may include more than 33 million nanoantennas, is designed, fabricated, and used as the achromatic meta-lens array 602 in the system 600. In this example, the diameter of each achromatic meta-lens of the meta-lens array is 21.65 µm, and the designed focal length is 49 µm. The design principle of the achromatic meta-lens is based on the Pancharatnam-Berry phase, phase compensation, and integrated resonant units method, as explained in greater detail below.

The dispersion phase formula for a focusing meta-lens can be expressed as:

$$\varphi(R, \lambda) = -\left[2\pi\left(\sqrt{R^2 + f^2}\right) - f\right]\frac{1}{\lambda}, \lambda \in \{\lambda_{min}, \lambda_{max}\} \quad (1)$$

where $\varphi(R, \lambda)$ is the phase distribution function of the meta-lens, R is the distance from any point on the meta-lens to the geometric center of the meta-lens, $\lambda$ is the wavelength of the incident light, $\lambda_{min}$ is the minimum wavelength of the incident light, $\lambda_{max}$ is the maximum wavelength of the incident light, and f is the preset focal length of the meta-lens. Given a designed focal length, the phase distribution of focusing is related to operation $\lambda$ and R. Different input wavelengths can lead to different phase distributions.

Equation (1) can be divided into two parts, as:

$$\varphi_{Lens}(R,\lambda) = \varphi(R,\lambda_{max}) + \Delta\varphi(R,\lambda) \quad (2)$$

In equation (2), the first part $\varphi(R, \lambda_{max})$ is the main phase relevant to $\lambda_{max}$. This part of phase distribution can be realized by Pancharatnam-Berry phase design principle. In this example the nanostructure has rotated an angle, θ, to provide a 2θ phase arrangement. In this example the incident light is set as circular polarization light according to the operation principle of the Pancharatnam-Berry phase method. The second part $\Delta\varphi(R, \lambda)$ is the required phase compensation between $\lambda_{max}$ and other operation wavelengths:

$$\Delta\varphi(R, \lambda) = -\left[2\pi\left(\sqrt{R^2 + f^2}\right) - f\right]\left(\frac{1}{\lambda} - \frac{1}{\lambda_{max}}\right) + \frac{a}{\lambda} + b \quad (3)$$

where a equals to $$\delta = \frac{\lambda_{max}\lambda_{min}}{\lambda_{max} - \lambda_{min}}$$

and b equals to $$-\delta = \frac{\lambda_{min}}{\lambda_{max} - \lambda_{min}}.$$

Figure 7B:
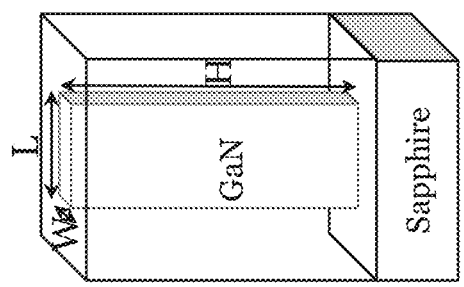
FIG. 7B is a schematic diagram illustrating another gallium nitride (GaN) based nanostructure in a meta-lens in one embodiment of the invention.
Figure 7A:
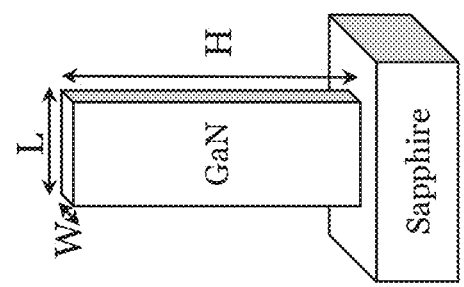
FIG. 7A is a schematic diagram illustrating a gallium nitride (GaN) based nanostructure in a meta-lens in one embodiment of the invention.

In this example, nanostructures with different geometries and sizes are designed according to equation (3), as shown in Table 2, such that the phase requirement for the visible region from 400 nm to 660 nm is met. In this example, GaN is selected as the material of the achromatic meta-lens array as GaN has high refractive index and low loss in visible light spectrum. The achromatic meta-lens array in this example includes GaN solid subwavelength structures (e.g., nanostructures) and inverse (hollow) subwavelength structures (e.g., nanostructures), as illustrated in FIGS. 7A and 7B. These building blocks are simulated and calculated to evaluating the transmission spectra and phase compensation. Numerical simulations of the achromatic meta-lens array are performed using microwave studio commercial software based on finite integration method from Computer Simulation Technology (CST). In this example, the designed GaN solid subwavelength structures (e.g., nanostructures) and inverse subwavelength structures (e.g., nanostructures) are utilized to fulfill the phase requirements of the achromatic focusing in the wavelength range of 400 nm to 660 nm.

TABLE 2

| Type | L (nm) | W (nm) | Provided phase compensation (degrees) |
|---|---|---|---|
| Solid subwavelength structures (FIG. 7A) (H = 800 nm) | 80 | 45 | 660 |
| | 95 | 50 | 690 |
| | 115 | 50 | 720 |
| | 125 | 55 | 750 |
| | 130 | 60 | 780 |
| | 135 | 65 | 810 |
| | 135 | 70 | 840 |
| | 140 | 75 | 870 |
| | 140 | 80 | 900 |
| | 145 | 85 | 930 |
| | 150 | 90 | 960 |
| | 155 | 95 | 990 |
| | 165 | 100 | 1020 |
| | 165 | 110 | 1050 |
| Inverse subwavelength structures (FIG. 7B) (H = 800 nm) | 163 | 80 | 1080 |
| | 140 | 60 | 1110 |
| | 125 | 50 | 1140 |

Figure 8:
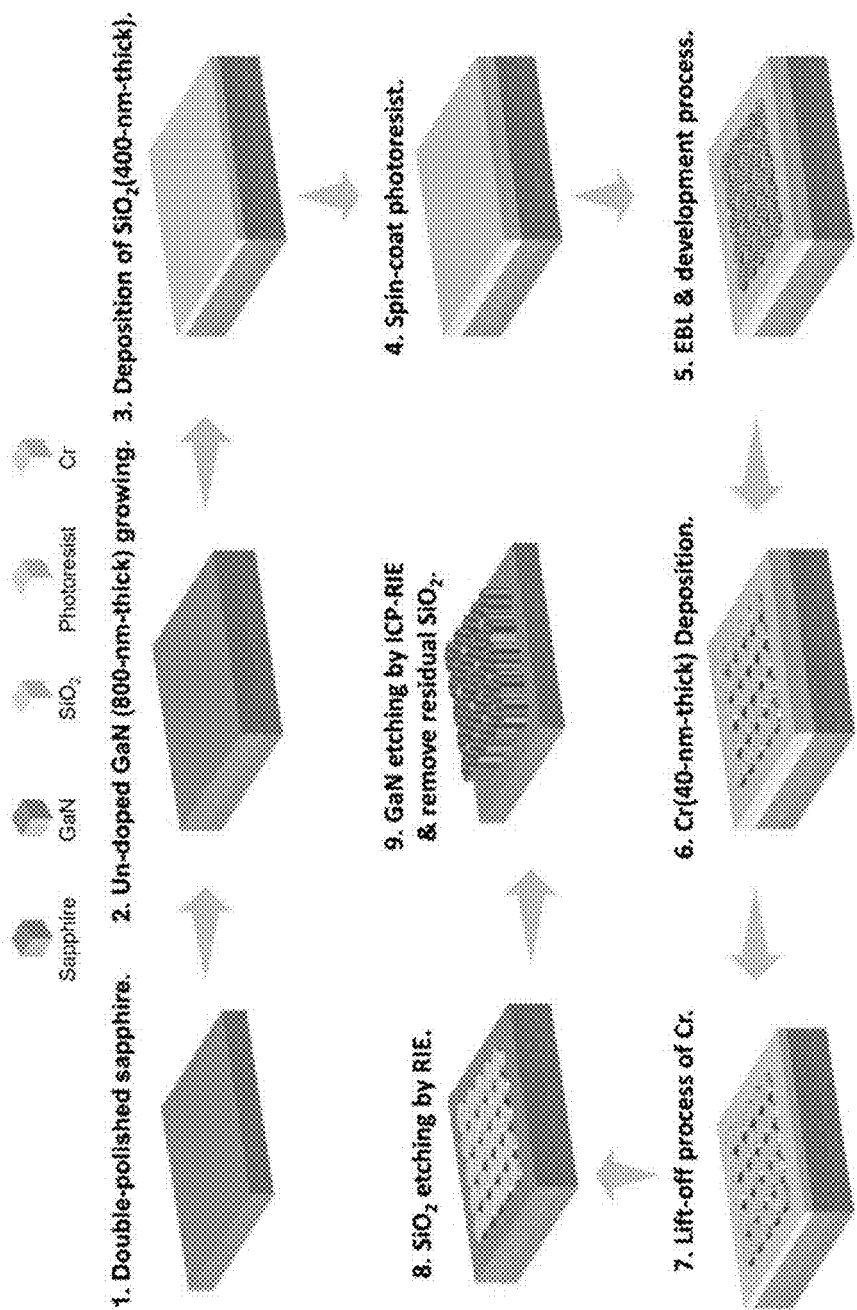
FIG. 8 is a schematic diagram illustrating a method for fabricating a meta-lens array in one embodiment of the invention.

FIG. 8 shows a method for making a GaN-based achromatic meta-lens array (such as the above-mentioned meta-lens array) in one embodiment of the invention. As shown in FIG. 8, in this embodiment, an undoped GaN layer (about 800 nm) is grown on a prepared double-sided polished sapphire substrate using metal-organic chemical vapor deposition (MOCVD). The gallium and nitrogen precursors of the deposition are trimethylgallium (TMGa) and $NH_3$ respectively. Then, a $SiO_2$ layer (about 400 nm) is deposited on the top of GaN layer using plasma-enhanced chemical vapor deposition (PECVD). The $SiO_2$ layer is selected as the hard mask for etching GaN nanostructures of the achromatic meta-lens array. A positive tone electron-beam photoresist is spin-coated onto the $SiO_2$/GaN substrate. The resist is diluted ZEP-520A which is diluted with ZEPA (ZEP-520A:ZEPA=1:3). The thickness of the resist is about 150 nm. An electron-beam lithography system (Elionix ELS-7000) is employed to define the nanostructure layout of the meta-lens. The pattern of the meta-lens is developed by the development process with ZED-N50. A Cr layer (about 40 nm) is deposited on the top of the meta-lens using an electron-gun evaporator. After the lift-off process in N,Ndi-methylacetamide (ZDMAC) solution, the Cr patterned layer is revealed and used to be the hard mask to etch $SiO_2$ layer using reactive ion etching (RIE). Then, the pattern of the achromatic meta-lens array is transferred to the $SiO_2$ layer. The GaN nanostructures are etched by inductively coupled plasma reactive ion etching (ICP-RIE) with $BCl_3/Cl_2$. In this example, the ICP source power is 700 W, and the bias power of 280 W. Afterwards, a buffered oxide etch (BOE) solution is used to remove the $SiO_2$ hard mask layer. The GaN achromatic meta-lens array is then obtained.

Figure 9:
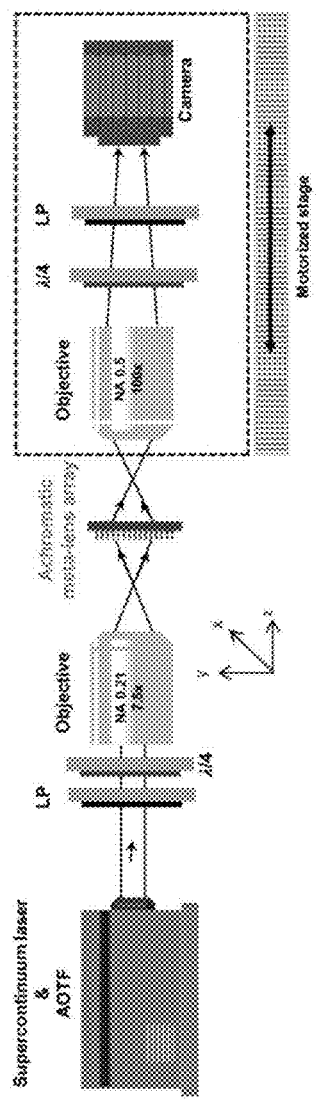
FIG. 9 is a schematic diagram illustrating an experimental setup for characterizing the achromatic meta-lens array made based on the method of FIG. 8 in one embodiment of the invention.
Figure 11:
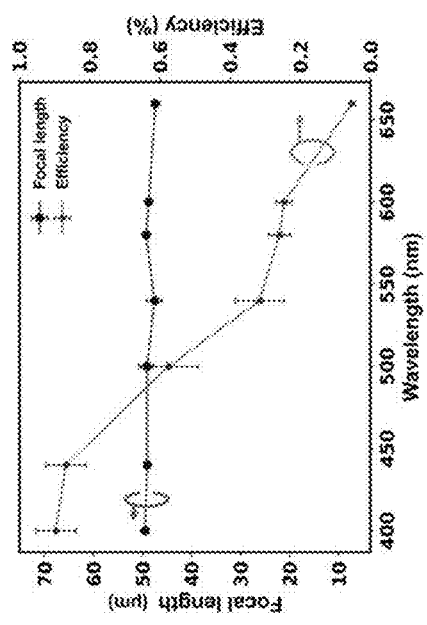
FIG. 11 is a graph showing measured focal length and the calculated efficiency of the achromatic meta-lens in the visible light range.
Figure 10:
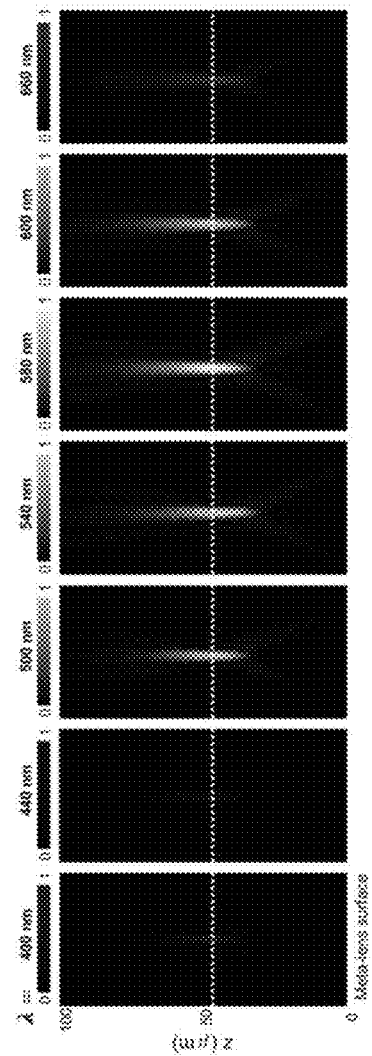
FIG. 10 are images showing measured light intensity distribution profiles in the z-direction of the achromatic meta-lens in the visible light range.

FIGS. 9 to 11 relate to characterization and measurement of the achromatic meta-lens array fabricated using the method of FIG. 8. FIG. 9 shows the experimental setup using for the characterization and measurement. FIG. 10 shows the measured light intensity distribution profiles in the z-direction of the achromatic meta-lens in the visible light range (the white dashed line indicates the position of 49 μm of the z-axis), measured using the setup in FIG. 9. FIG. 11 shows measured focal length and calculated efficiency of the achromatic meta-lens in the visible light range, measured using the setup in FIG. 9.

The setup in FIG. 9 is used for characterizing the focusing behavior of the fabricated achromatic meta-lens array. In this example setup, a supercontinuum laser source is used as the light source, and the individual incident wavelength is selected with the acousto-optic tunable filters (AOTF). The laser beam with a circular polarization state is generated using a first set of linear polarizer and quarter-wave plate. A first objective lens (7.5×, NA=0.21) is used to focus the incident circularly polarized light onto the achromatic meta-lens, and a second objective lens (100×, NA=0.5) is used to collect the focused spot from the achromatic meta-lens in transmission. A second set of linear polarizer and quarter-wave plate is used to select the modulated light, for receipt by the camera. In this example, the second objective lens, the second set of linear polarizer and quarter-wave plate, and the camera are mounted on a motorized stage or platform for scanning and capturing the light intensity profile in the z-axis. The obtained focusing behavior of achromatic meta-lens at various incident visible light wavelengths is shown in FIG. 10. The calculated average operation efficiency is 39%. The efficiency is defined as the ratio of the focused circularly-polarized beam optical power to the power of the incident light with the opposite circular polarization. The average measured focal length is 48.6 μm in the designed operation band (visible light band), as shown in Figure ii.

Figures 12A, 12B, 12C:
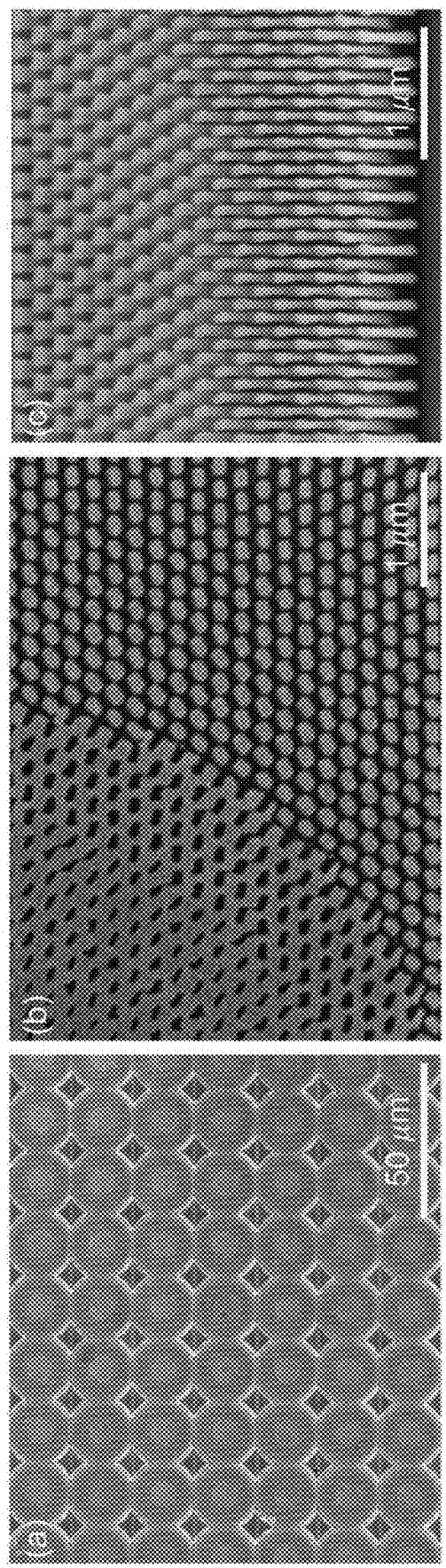
FIG. 12A is a scanning electron microscope image of the achromatic meta-lens array.
FIG. 12B is a scanning electron microscope image of an edge of the achromatic meta-lenses of the achromatic meta-lens array in FIG. 12A.
FIG. 12C is a scanning electron microscope image (30° tilt angle view) of the achromatic meta-lens showing the nanoantennas at the edge of the achromatic meta-lenses.

FIGS. 12A to 12C show the scanning electron microscope (SEM) images of the fabricated achromatic meta-lens array in this embodiment, with different magnifications (FIGS. 12A, 12B) and a tiled angle view (FIG. 12C). In this example, the height of the nanostructures of the meta-lens is 800 nm. The solid and inverse nanoantennas with various orientations and sizes are designed and arranged to provide a serial phase compensation in the visible light region. The average measured achromatic focal length is 48.6 μm with an average efficiency of 33.6% from 400 nm to 660 nm in the visible light range. The slight difference in the focal length between design and measurement may be due to the moving accuracy (±0.30 μm) of the motorized linear stage (GTS-70, Newport) in the setup of FIG. 9.

In some embodiments, a meta-device, such as but not limited to the meta-lens array disclosed above, is integrated into a light-field and structured-light imaging system, to enable depth imaging and mapping at different light conditions/levels associated with the scene to be imaged and/or the environment in which the imaging system is arranged. In one embodiment of the system, light-field imaging and structured-light imaging are complementary to each other. For example, the light-field imaging can be used for imaging a scene in bright conditions (sufficient light) and the structured-light imaging can be used for imaging a scene in dim or dark conditions (insufficient light). Both can be used to facilitate depth imaging and mapping. The light-field imaging can provide a light-field image of the scene whereas the structured-light imaging can provide a structured-light image of the scene. The light-field image (or related image data) and the structured-light image (or related image data) can be processed to determine depth information associated with the scene or object(s) in the scene.

As will be described in more detail below, a 3D test sample consisting of six generally planar and vertically patterned (with yellow spots, color not shown) plates (forming a stairs) arranged at depths 22 cm, 24 cm, 27 cm, 31 cm, 38 cm, and 46 cm, respectively, are imaged using the light-field and structured-light imaging system to test its performance. In this example, the depths are determined or measured with respect to the vertical axis of the camera lens. Referenced depth mapping and imaging results are obtained from the depth of 21.0 cm to 50.5 cm at an interval of 0.5 cm using a similar patterned board. The depth imaging and mapping data associated with light-field imaging is collected and processed using a light-field imaging data processing method whereas the depth imaging and mapping data associated with structured-light imaging is collected and processed using a structured-light imaging data processing method. The light-field imaging data processing method includes a preprocessing procedure, a machine learning based processing procedure (e.g., with a convolutional neural network), and a post-processing procedure. The structured-light data processing method includes a preprocessing procedure, a machine learning based processing procedure (e.g., with a convolutional neural network), and a post-processing procedure.

FIGS. 13 to 16B relate to a light-field imaging system with an achromatic meta-lens array in one embodiment of the invention. The light-field imaging system can be part of a light-field and structured-light imaging system (the part of the light-field and structured-light imaging system responsible for performing light-field imaging or for operating in light-field imaging mode) and can be used for imaging a scene when sufficient light exists in the scene or in the environment in which the imaging system is arranged. The light-field imaging system can alternatively be a stand-alone system.

Figure 13:
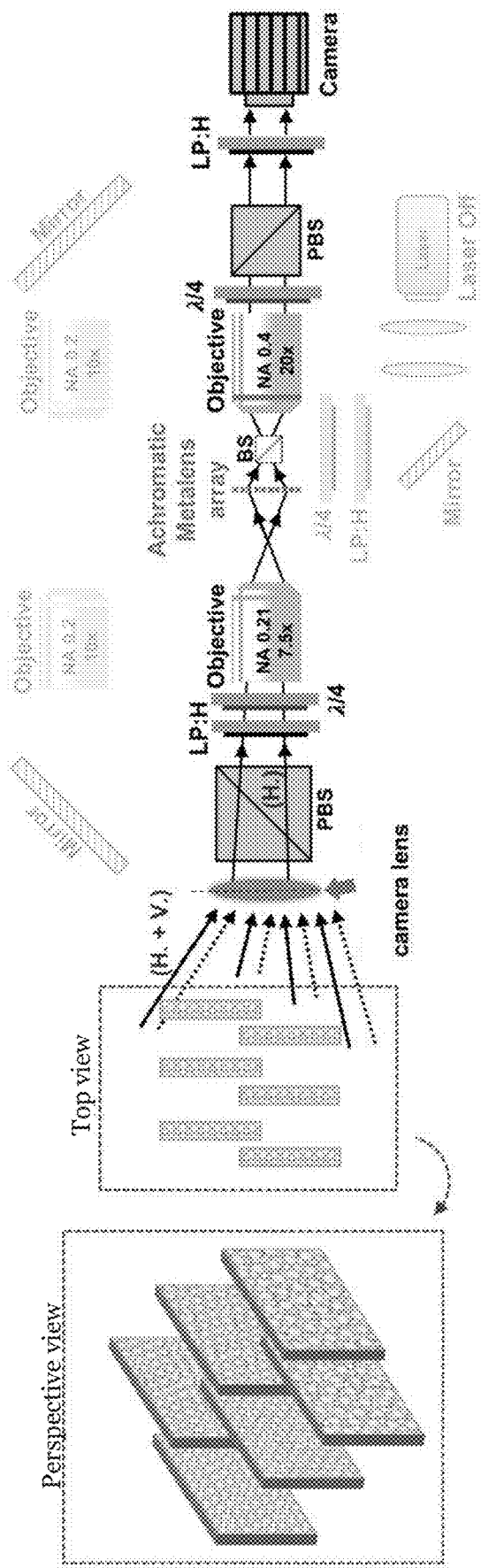
FIG. 13 is a schematic diagram of a light-field imaging system in one embodiment of the invention.

Referring to FIG. 13, the light-field imaging system includes an image acquisition device in the form of a camera, and a light-field imaging arrangement including an achromatic meta-lens array operable to facilitate imaging of a light-field of a target scene. The achromatic meta-lens array may be the one presented above. In this example, the target scene includes six generally planar and vertically patterned plates (forming a stairs) arranged at depths 22 cm, 24 cm, 27 cm, 31 cm, 38 cm, and 46 cm, respectively. In this example, the light-field imaging arrangement includes a lens ("camera lens") arranged to receive light-field associated with the target scene, a first optical assembly optically coupled between the lens ("camera lens") and the achromatic meta-lens array, and a second optical assembly optically coupled between the achromatic meta-lens array and the camera. The first optical assembly, the achromatic meta-lens array, and the second optical assembly are arranged to process the received light-field for imaging by the camera.

In this example, the first optical assembly includes polarization beam splitter ("PBS"), a polarization manipulation assembly optically coupled with the polarization beam splitter, and an objective lens optically coupled with the polarization manipulation assembly. The polarization manipulation assembly includes a quarter-wave ($\lambda/4$) plate and a horizontal linear polarizer (LP:H) that are optically coupled. In this example, the horizontal linear polarizer is optically coupled between the quarter-wave plate and the polarization beam splitter. The polarization beam splitter is optically coupled between the lens and the horizontal linear polarizer whereas the quarter-wave plate is optically coupled between the horizontal linear polarizer and the objective lens. In this example, the objective lens has a numerical aperture of 0.21 and a 7.5× magnification.

In this example, the second optical assembly includes an objective lens, a polarization manipulation assembly optically coupled between the objective lens and the camera, and a beam splitter optically coupled between the achromatic meta-lens array and the objective lens. The polarization manipulation assembly includes a quarter-wave plate, a polarization beam splitter, and a horizontal linear polarizer that are optically coupled. The horizontal linear polarizer is optically coupled between the polarization beam splitter and the camera, the polarization beam splitter is optically coupled between the quarter-wave plate and the horizontal linear polarizer, and the quarter-wave plate is optically coupled between the objective lens and the polarization beam splitter.

In this embodiment, the achromatic metalens array is used as an imaging component of the light-field imaging system, under bright light conditions (of the scene or environment). In operation of the system, the incident light is converted to circular polarization light to satisfy the working principle of the achromatic meta-lens for focusing and imaging. The linear polarizer and the quarter waveplate in front of the meta-lens array (on the left hand side of the meta-lens array, in FIG. 13) are used to change the polarization of the incoming light to the left-hand circular polarization. The objective lens (Mitutoyo 7.5×, NA=0.21) is used to collect the light on the meta-lens array. The objective lens (Mitutoyo 20×, NA=0.4) behind the meta-lens array (on the right hand side of the meta-lens array, in FIG. 13) is to collect the light. The other linear polarizer and quarter wave plate set allows the modulated light to go through and be acquired by the camera.

Figure 14A:
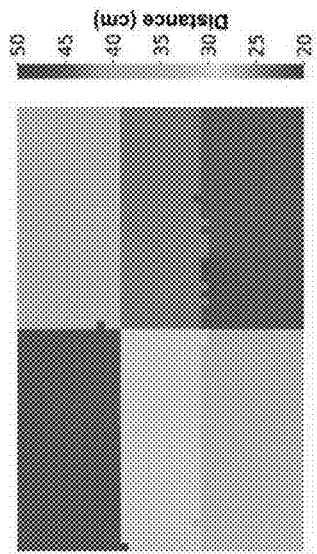
FIG. 14A is a light-field image of a sample object (stairs) obtained by the light-field imaging system of FIG. 13, with a focus on the depth of 55 cm in one example.
Figure 14B:
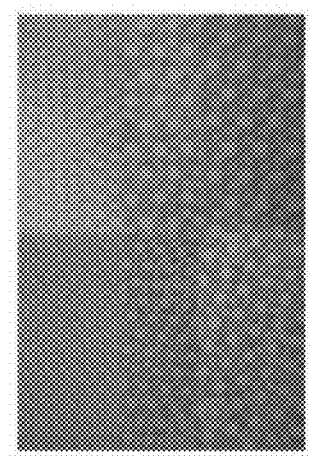
FIG. 14B is a corresponding light-field image based depth map.

FIG. 14A shows the light-field rendered image of the scene (the stairs) presenting the actual layout with a focus on the depth of 55 cm. It can be seen that light-field imaging is sensitive to depth changes. FIG. 14B displays the depth map results corresponding to the image in FIG. 14A. It can be seen that the six parts of the stairs and their corresponding positions can be differentiated.

Figure 15:
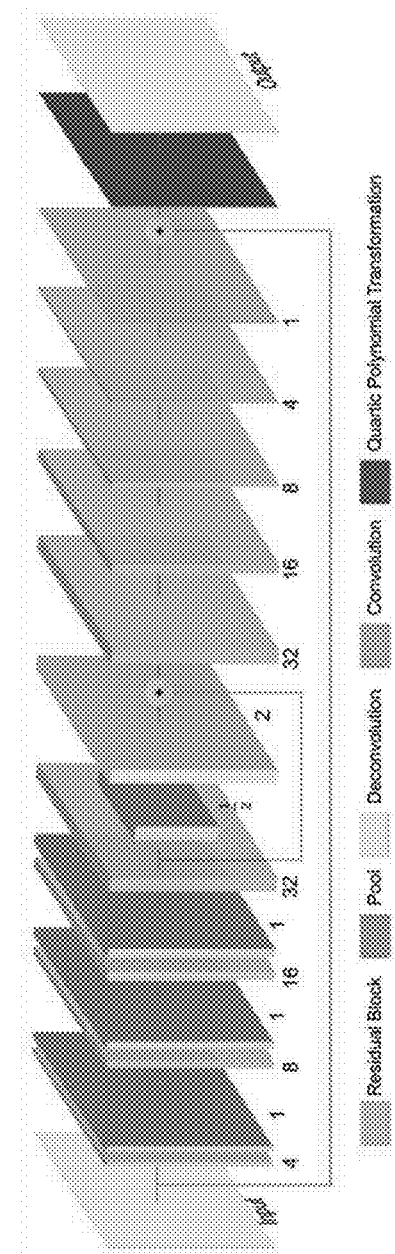
FIG. 15 is a schematic diagram of a CNN-based model (light-field net (LFN)) for use in processing the light-field image data obtained by the light-field imaging system of FIG. 13 for depth determination in one embodiment of the invention.

FIG. 15 shows a neural network model for processing the light-field imaging data obtained by the light-field imaging system in FIG. 13 to determine depth information in one embodiment of the invention. In this embodiment, the neural network is referred to as a light-field net (LFN). In one embodiment, the imaging disparity, given by the block matching of the raw data of light-field image data obtained by the light-field imaging system in FIG. 13, can be fed to the light-field net (LFN). As shown in FIG. 15, the light-field net adopts a symmetrical framework and includes an encoder module and a decoder module. In this example, the encoder includes four residual blocks (4, 8, 16, 32) each followed by a respective pooling layer (1, 1, 1, ½) to obtain low-resolution semantic representations. In this example, the decoder covers an inverse up-sampling layer to recover the spatial resolution and four stacked residual blocks (32, 16, 8, 4) to enhance the feature representations. Considering the implicit relationship between disparity and depth, a quartic polynomial layer is included to evaluate point-to-point projection. In FIG. 15, different tensor operations are illustrated using different color or greyness. The numbers below the pool blocks and deconvolution blocks are the scaling factors on the resolution after pooling and deconvolution, respectively. Other illustrated numbers are the numbers of output channels after the corresponding operation.

Figure 16B:
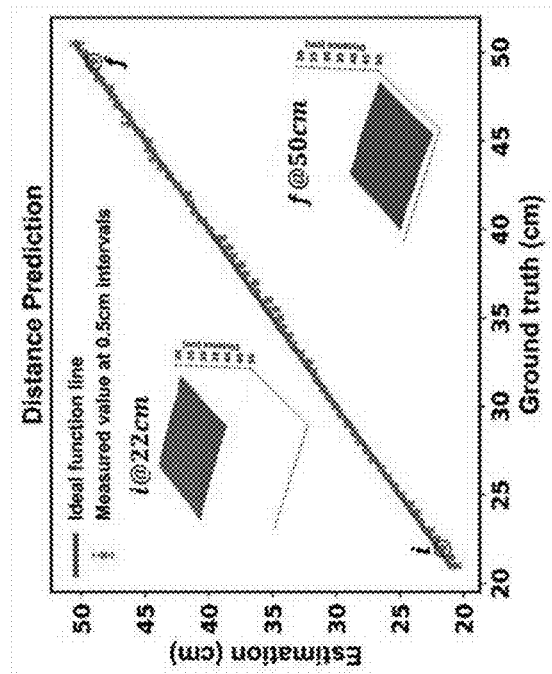
FIG. 16B is a graph showing depth/distance estimated based on the light-field obtained by the light-field imaging system of FIG. 13 against known reference depth/distance ("ground truth")
Figure 16A:
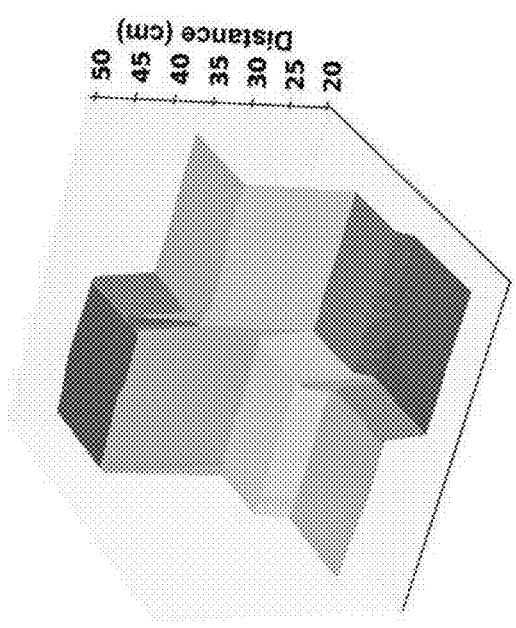
FIG. 16A is a plot of the results of the depth mapping using the CNN-based model of FIG. 15.

FIG. 16A shows the results of depth mapping obtained after LFN data processing (3D color map of each steps of the stairs). The determined depths/distances generally match their actual depths/distances. The uniformity of colors and the flatness of each steps of the stairs reflect the system's robustness and anti-interference ability. With the meta-lenses light-field images, 3D perception of the steps of the stair can be clearly presented.

FIG. 16B shows a diagram showing depth/distance estimated based on the light-field obtained by the light-field imaging system of FIG. 13 against known reference depth/distance ("ground truth") of the steps of the stairs.

A set of scanning images, of which the visual field is of the same depth, are taken using the system for evaluation. In one example, the model of FIG. 15 is applied to process a test set to derive a set of 36×56 depth maps. The ideal function line (straight line) represents an accurately estimated ideal proportional function line (when the predicted depth/distance is the same as the reference depth/distance). The fuchsia star labels are the mean value of the measured depth maps from 21.0 to 50.5 cm. The standard deviation of the entire measurement range is less than 0.5 cm. The inserted images are the depth mapping images at i point of 22 cm and f point of 50 cm, respectively. The standard deviation (STD) shown in the inserted image of FIG. 16B is less than 0.5 cm, and the error bar is barely seen. These results demonstrate that this light-field depth mapping and imaging system can provide accurate measurements of the training depth references across the whole operation range from 21.0 to 50.5 cm.

Details of the data processing and the LFN will be described in further detail below.

FIGS. 17 to 20B relate to a structured-light imaging system with an achromatic meta-lens array in one embodiment of the invention. The structured-light imaging system can be part of a light-field and structured-light imaging system (the part of the light-field and structured-light imaging system responsible for performing structured-light imaging or for operating in structured-light imaging mode) and is used for imaging a scene when insufficient light exists in the scene or in the environment in which the imaging system is arranged (illustrated using the dark background in FIG. 17). The structured-light imaging system can alternatively be a stand-alone system.

Figure 17:
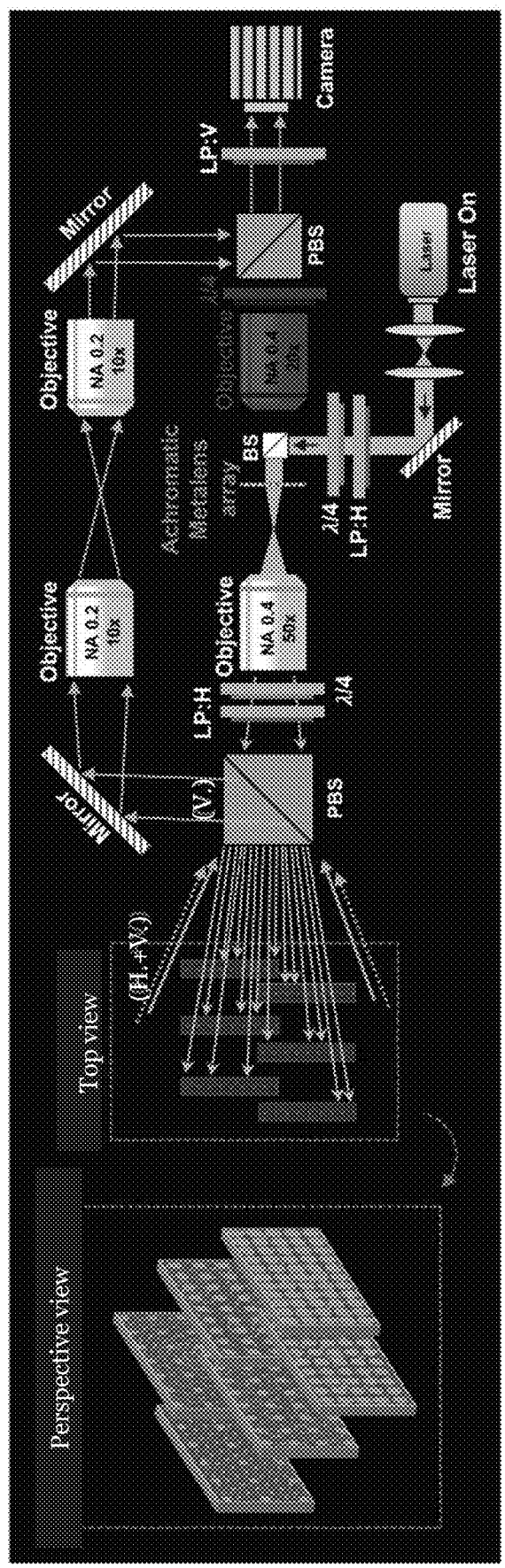
FIG. 17 is a schematic diagram of a structured-light imaging system in one embodiment of the invention.

Referring to FIG. 17, the structured-light imaging system includes an image acquisition device in the form of a camera, and a structured-light imaging arrangement including an achromatic meta-lens array operable to facilitate generation of structured-light to be provided to a target scene to facilitate imaging of the target scene. The achromatic meta-lens array may be the one presented above (with 3600 achromatic lenses). In this example, the target scene includes six generally planar and vertically patterned plates (forming a stairs) arranged at depths 22 cm, 24 cm, 27 cm, 31 cm, 38 cm, and 46 cm, respectively. In this example, the structured-light imaging arrangement includes a light source in the form of a laser source (e.g., a 532 nm laser), a first optical assembly optically coupled between the light source and the achromatic meta-lens array, and a second optical assembly optically coupled with the achromatic meta-lens array and the camera. The second optical assembly is operable to guide or process the structured-light and provide it to the target scene and to receive or process the light reflected from the target scene as a result of the light provided to the target scene.

In this example, the first optical assembly includes a polarization manipulation assembly, and a beam splitter optically coupled between the polarization manipulation assembly and the achromatic meta-lens array. The polarization manipulation assembly comprises a quarter-wave ($\lambda/4$) plate and a horizontal linear polarizer (LP:H). The horizontal linear polarizer is optically coupled between the quarter-wave plate and the laser source. In this example, the first optical assembly further includes a pair of lens optically coupled with the laser source and a reflector in the form of a mirror optically coupled between the pair of lens and the polarization manipulation assembly.

In this example, the second optical assembly includes an objective lens, a polarization manipulation assembly optically coupled with the objective lens, a polarization beam splitter optically coupled with the polarization manipulation assembly. The polarization beam splitter is arranged/to be arranged between the target scene and the polarization manipulation assembly and is operable to guide and provide light to and receive reflected light from the target scene. The second optical assembly also includes an optical sub-assembly optically coupled between the polarization beam splitter and the camera to guide or process, and provide, the light received from the target scene for providing to the camera. The objective lens in this example has a magnification of 50× and numeral aperture of 0.4. The polarization manipulation assembly includes: a quarter-wave plate and a horizontal linear polarizer that are optically coupled. The linear polarizer is optically coupled between the quarter-wave plate and the polarization beam splitter whereas the quarter-wave. The optical sub-assembly includes a further polarization beam splitter and a vertical linear polarizer (LP:V) that are optically coupled. The vertical linear polarizer is optically coupled between the further polarization beam splitter and the camera whereas the further polarization beam splitter is optically coupled between the polarization beam splitter and the camera.

In this example, the optical sub-assembly further includes optical guide assembly for guiding light from the polarization beam splitter to the further polarization beam splitter. The optical guide assembly includes two mirrors arranged at an angle to each other and a pair of objective lens optically coupled between the two mirrors. The first mirror is operable to reflect light from the polarization beam splitter to the second mirror via the pair of objective lens. The second mirror is operable to reflect light from the pair of objective lens to the further polarization beam splitter. In this example, the two objective lens of the optical guide assembly have the same magnification of 10x and numeral aperture of 0.2.

In some embodiments of a light-field and structured-light imaging system, optical components that are identical in the light-field imaging system of FIG. 13 and in the structured-light imaging system of FIG. 17 can be provided by the same optical components (shared use by the two systems), or they may be duplicated such that each of the systems has its own optical components.

In this embodiment, the achromatic metalens array is used to project a focused spots array as the structured-light to the scene to facilitate imaging of the scene, under no or low light conditions (of the scene or environment). In operation of the system in this embodiment, a continuous wave laser beam, with $\lambda$=532 nm, is provided by the laser source. The laser beam is guided and reflected by the beam splitter and transmits through the meta-lens array. An array of the focused spots can then be generated and projected onto the target objects. In this system of FIG. 17, the camera lens (FIG. 13) is removed or otherwise not used and the magnification of the objective lens is changed to 50×, which is used to enlarge the size of the focused spots array. The dotted arrows are the light ray direction of the vertical polarization. The two objective lens with 10× magnification are used to produce a suitable size image for the camera. The two polarization beam splitters, near the objects and near the camera respectively, are used to make a coaxial, optical path in the structured-light imaging mode.

Figure 18A:
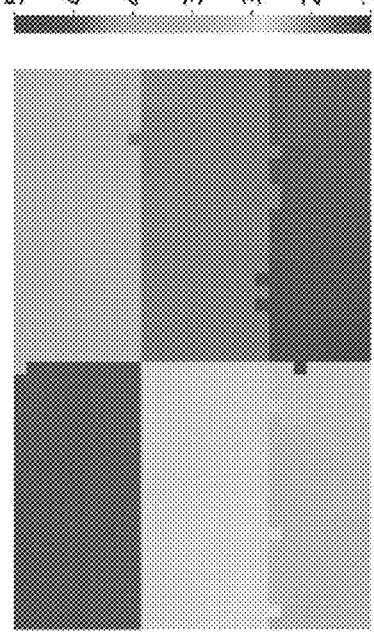
FIG. 18A is a structured-light image of a sample object (stairs) obtained by the structured-light imaging system of FIG. 17 in one example.
Figure 18B:
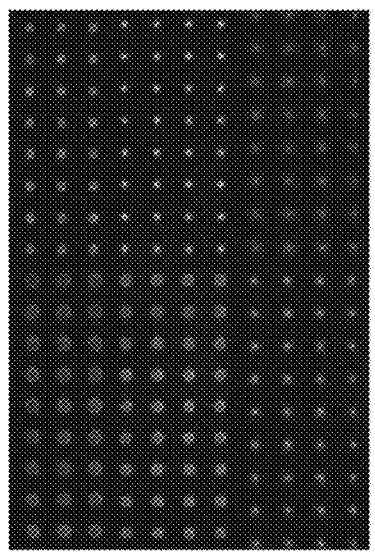
FIG. 18B is a corresponding structured-light image based depth map.

FIG. 18A shows the structured-light rendered image of the scene (the stairs) presenting the actual layout. It can be seen that structured-light rendered image includes differently structured-light spots corresponding to the six parts of the stairs. FIG. 18B displays the depth map results corresponding to the image in FIG. 18A. It can be seen that the six parts of the stairs and their corresponding positions can be differentiated.

Figure 19:
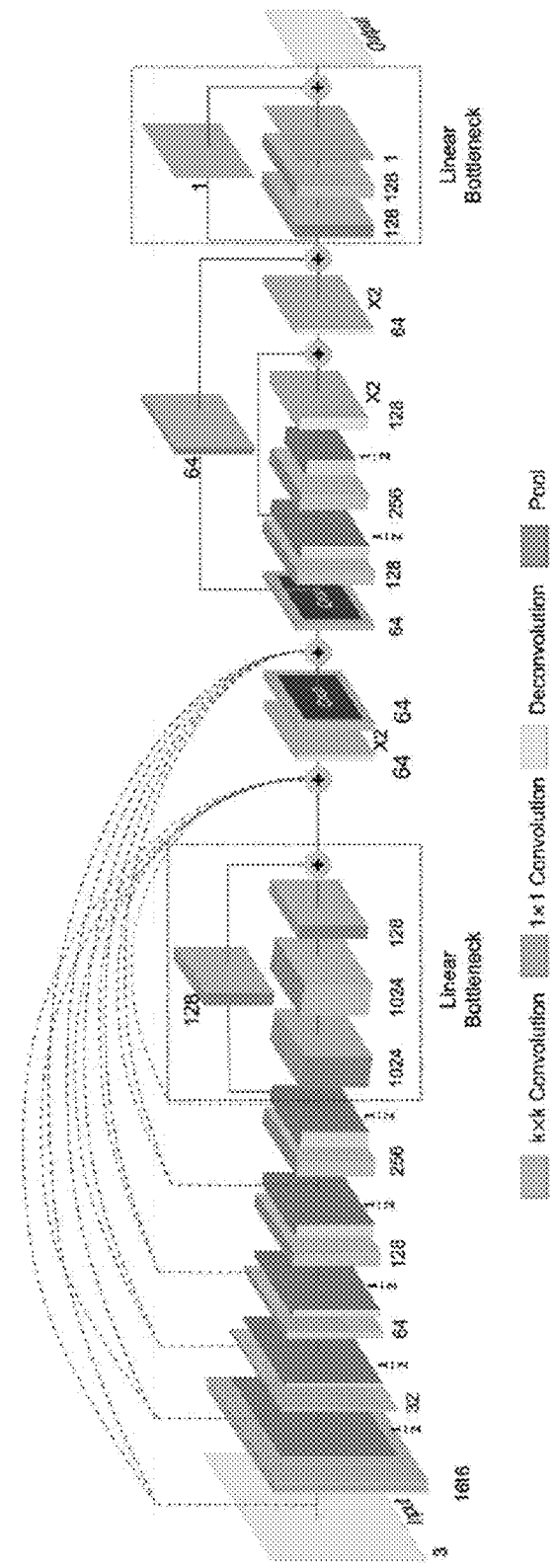
FIG. 19 is a schematic diagram of a CNN-based model (structured-light net (SLN)) for use in processing the structured-light image data obtained by the structured-light imaging system of FIG. 17 for depth determination in one embodiment of the invention.

FIG. 19 shows a neural network model for processing the structured-light imaging data obtained by the structured-light imaging system in FIG. 17 to determine depth information in one embodiment of the invention. In this embodiment, the neural network is referred to as a structured-light net (SLN). SLN is responsible for the semantic recognition of structured-light images. Unlike LFN in the above embodiment, SLN is a deeper and more complex neural network. In this example, the head of SLN is an encoder to extract features from the input image. SLN introduces the linear bottleneck from Mobile-NetV2 besides the normal functional layers. According to the changing law of structured-light, a block containing several structured-light spots in the image can be used to characterize the depth of the output. SLN can be very sensitive to small data changes. In FIG. 19, different tensor operations are illustrated using different color or greyness. The dashed lines indicate the skip connections. The numbers below the pool blocks and deconvolution blocks are the scaling factors on the resolution after pooling and deconvolution, respectively. Other illustrated numbers are the numbers of output channels after the corresponding operation.

Figure 20B:
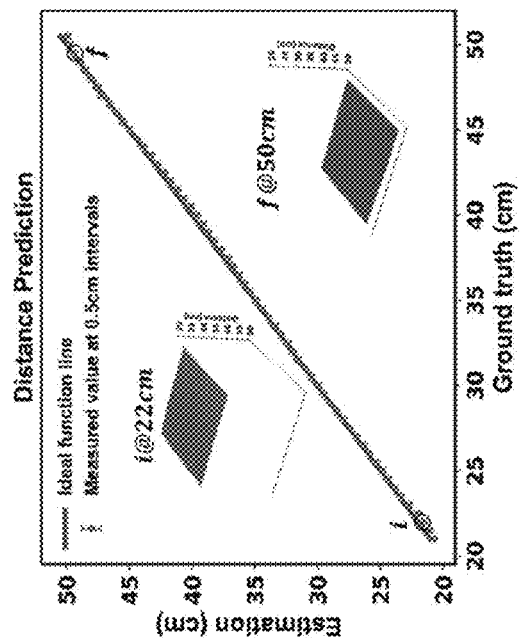
FIG. 20B is a graph showing depth/distance estimated based on the structured-light obtained by the structured-light imaging system of FIG. 17 against known reference depth/distance ("ground truth")
Figure 20A:
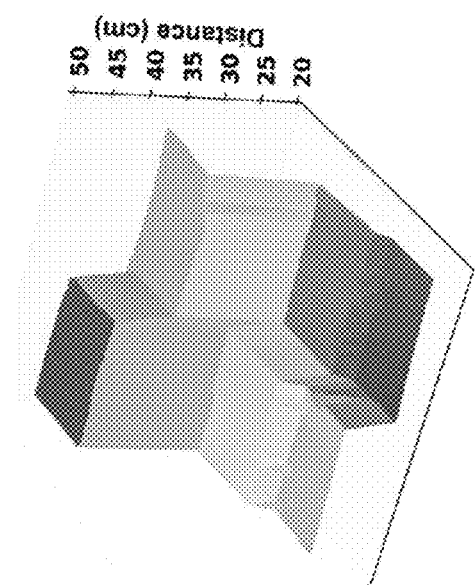
FIG. 20A is a plot of the results of the depth mapping using the CNN-based model of FIG. 19.

FIG. 20A shows the results of depth mapping obtained after SLN data processing (3D color map of each steps of the stairs). In this example, a 28×44 depth map is obtained after image processing. The depth results match the experimental model, and the fluctuation of the value at the boundary of the stair is almost controlled within one pixel.

FIG. 20B shows a diagram showing depth/distance estimated based on the structured-light obtained by the structured-light imaging system of FIG. 17 against known reference depth/distance ("ground truth") of the steps of the stairs. As shown in FIG. 20B, the solid line represents an accurately estimated ideal proportional function line. The fuchsia star labels are the mean values of the measured depth maps from 21.0 to 50.5 cm. The mean value of the evaluation and the ideal ground truth almost coincide. The results show that nearly all the STDs are less than 0.25 cm. This result shows that the structured-light imaging system is suitable for the 0.5 cm depth references provided. This system can operate effectively with or without the textures of the target object and background. In FIG. 20B, the inserted images are the depth mapping images at i point of 22 cm and f point of 50 cm, respectively.

Figure 21:
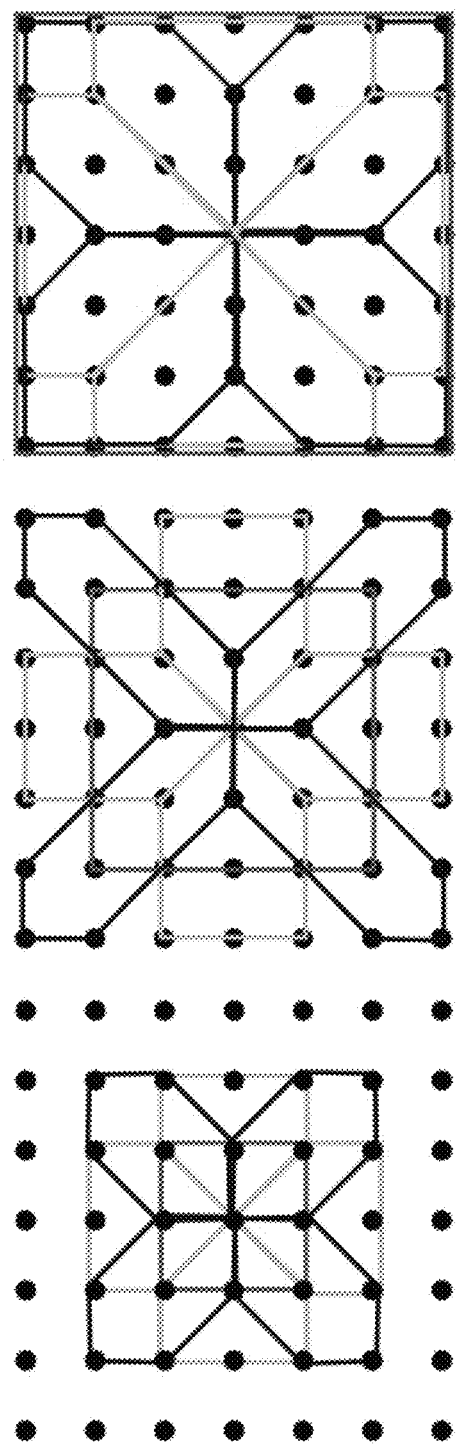
FIG. 21 is a schematic diagram of an adaptive edge-preserving filter for use in processing light-field imaging data and structured-light imaging data in one embodiment of the invention.

In some embodiments, an adaptive edge-preserving filter (AEPF) is used to process the light-field imaging data and structured-light imaging data and/or to calibrate the depth determination results and to improve depth/distance estimation accuracy. The AEPF may be an ameliorated postprocessor based on the selective edge-preserving smoothing method, which can provide improved performance in denoising. In one example, each pixel in the original depth map will be updated by AEPF from the target pixel itself and its a×b (e.g., 7×7) neighborhood. The target pixel to be processed serves as the center pixel of the region and forms a×b (e.g., 7×7) neighborhood with the surrounding pixels. Because the area with the smallest variance is usually considered the flattest area, the principle of this postprocessor is to select the patch with the smallest variance in this a×b (e.g., 7×7) target neighborhood, and the average value of the patch is assigned to the corresponding pixel of the resulting map. FIG. 21 shows a schematic illustration of an example adaptive edge-preserving filter. As shown in FIG. 17, AEPF adopts three stretched variants of squares, pentagons, and hexagons with different orientations, to form a total of 27 patches. These patches cover almost all the edge cases of natural images. The combination of square, pentagon, and hexagon ensures the selection of the flattest neighborhood of the target pixel while preserving the edge details of the image itself. The different boundaries are basically the angle formed by the central pixel and its partner pixels, and this postprocessor ensures 90° angular accuracy in any direction, which is sufficient to fulfill the smoothing requirements of natural images. Different sizes of the same shape promise noise robustness. Under the same edge conditions, a larger area is less sensitive to variance fluctuations caused by noise. The square in the filter expands from 3×3 to 5×5 and then to 7×7 in turn, which is applicable to smooth the center of a large flat area. From the perspective of a spatial cylinder, pentagons and hexagons first extend along the axial direction and then expand radially. The different growth directions of the three shapes also make the search block overlap the correct answer to the greatest extent and provide the best smoothing performance under the prerequisite of edge preservation. In short, this filter is adaptive to various edge types and statistically distributed noise. By adopting the variance as the metrics, the central pixel is updated to the mean value of the flattest patch. The process does not require input of extra hyperparameters, and the postprocessor can automatically adjust according to the actual situation. The AEPF can process the intermediate and initial prediction data of the light-field and structured-light system to adapt to specific application scenarios. Modified versions of AEPF can be used in some embodiments. One modified version is with outlier elimination, and the other modified version is with variance threshold. Outlier elimination starts with the calculation of mean value ($\mu$) and STD ($\sigma$) of the 7×7 neighborhood, and later steps keep constant. This generally aims to clear the outlier data beyond [$\mu-\sigma$, $\mu+\sigma$] before further processing. Hence the raw data get filtered with edge preservation. On the other hand, variance threshold follows the same steps in the early stage, but it updates the final central pixel to all patches' mean value that variance is below a selected threshold.

Figure 22:
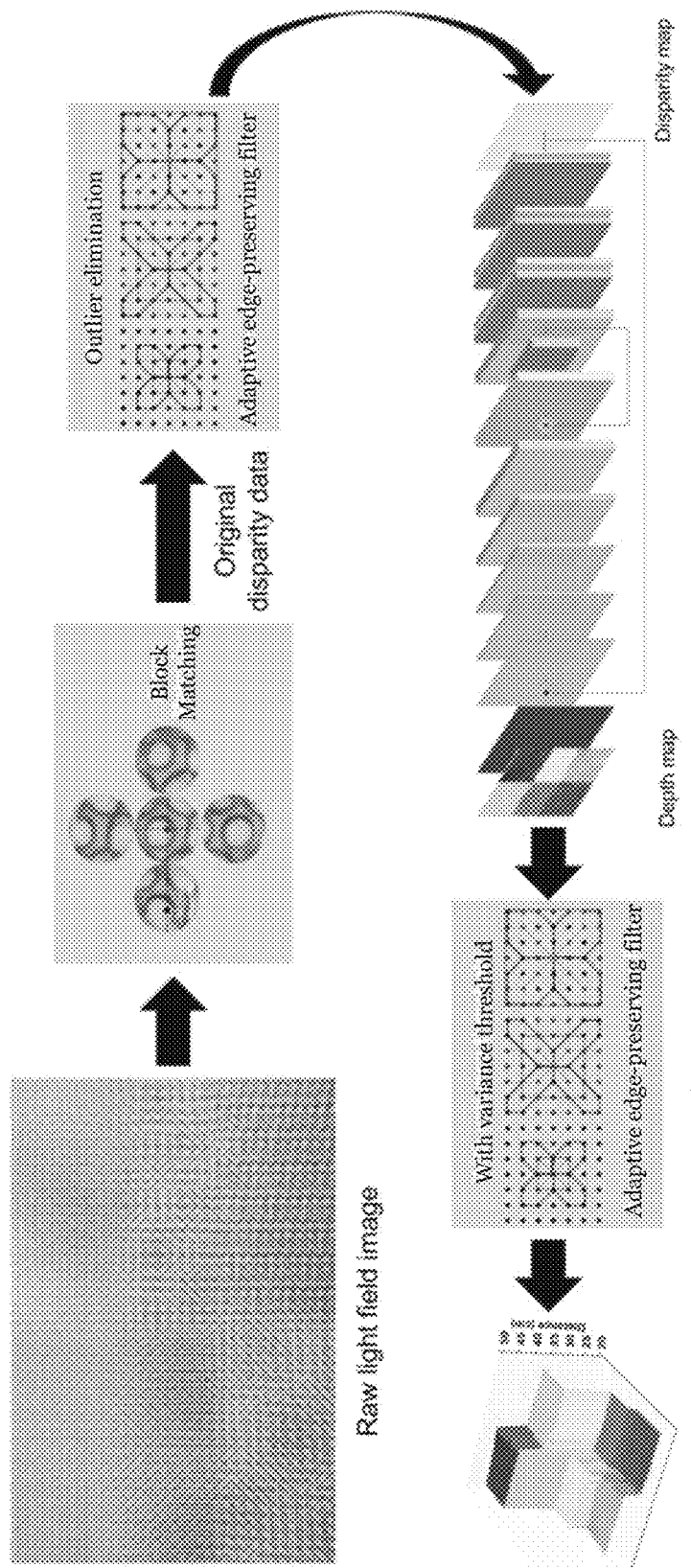
FIG. 22 is a schematic diagram illustrating a light-field imaging data processing operation in one embodiment of the invention.

FIG. 22 shows a light-field imaging data processing operation in one embodiment of the invention. The operation can be used to process light-field imaging data (or images) obtained using the light-field imaging system of FIG. 13.

In this embodiment, the light-field imaging data processing operation includes data (image data obtained using the light-field imaging system) preprocessing, LFN for depth estimation, and data (image data obtained using the light-field imaging system) postprocessing. The captured light-field image includes a large number of sub-images from different meta-lenses, recording both spatial and angular distribution of light from a single shot. In this example, each meta-lens images the same object from different angles. In this example, the meta-lens array can be considered as 60×60 eyes. In this example, limited by the aspect ratio of the camera sensor (of the camera), 36×56 meta-lens have been utilized. Therefore, there may exist disparities, parallaxes, between adjacent sub-images. The multi-eye stereo vision system obtains depth perception by observing the disparity of the same scene from different perspectives. Under the same optical system, there is a fixed functional relationship between disparity and distance. On the basis of this principle, the original image is transformed to a disparity map by a block matching algorithm. In block matching in this example, each sub-image is represented by a disparity value which is the pixel shift of similar patches shown in FIG. 22. The final value of the disparity is the average result of the disparities between the central sub-image and its four neighbor sub-images, namely, the upper, lower, left, and right sub-images. A 36×56 disparity map is obtained from the 5568×3712 pixels of the raw image. Sometimes, there are outliers in the disparity map due to the limit of the object pattern's visual view and gradient variation. An AEPF with outlier elimination is adopted before LFN is applied in processing the direct disparity data.

The disparity value obtained and distance value can be fitted to a high-order function curve. The value range of the disparity is small, so the numerical accuracy of the disparity is not high. Therefore, the direct output of the fitted function could be greatly influenced by small disparity value fluctuation. In this embodiment, the LFN comprehensively considers various factors, including the lighting conditions, the distribution of the surrounding parallax values, and especially the influence of other optical components. LFN increases the dimensionality of the input information and normalizes the input-output numerical accuracy. The fitted function is implanted at the end of the LFN, and a high-precision connection between the original disparity map and the distance map is established through training. With the direct depth map output from LFN, AEPF with variance threshold is performed, preferably multiple times. The final depth map is 36×56. The depth map resolution is influenced by the array size of metalenses and the size of the camera's CMOS sensor.

Figure 23:
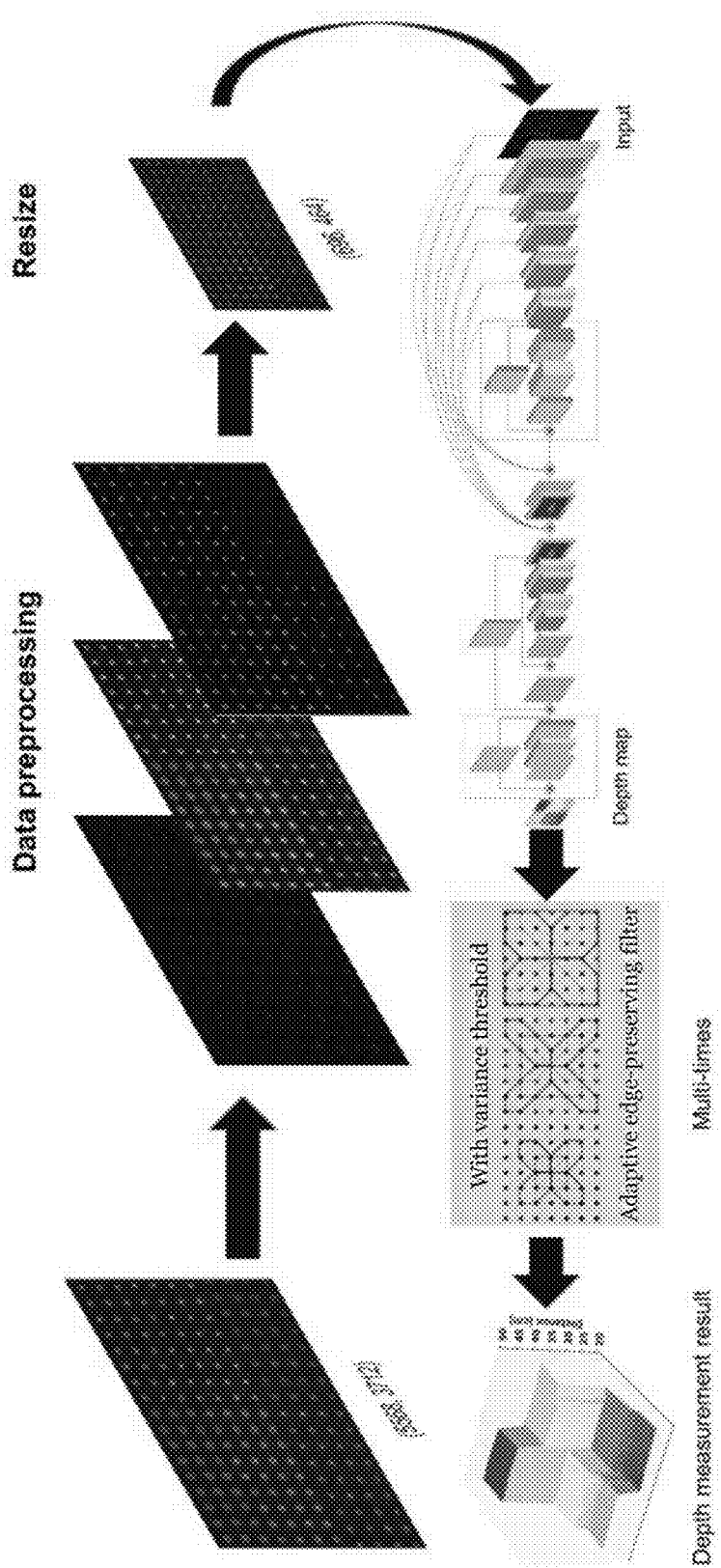
FIG. 23 is a schematic diagram illustrating a structured-light imaging data processing operation in one embodiment of the invention.

FIG. 23 shows a structured-light imaging data processing operation in one embodiment of the invention. The operation can be used to process structured-light imaging data (or images) obtained using the structured-light imaging system of FIG. 17.

Figure 24:
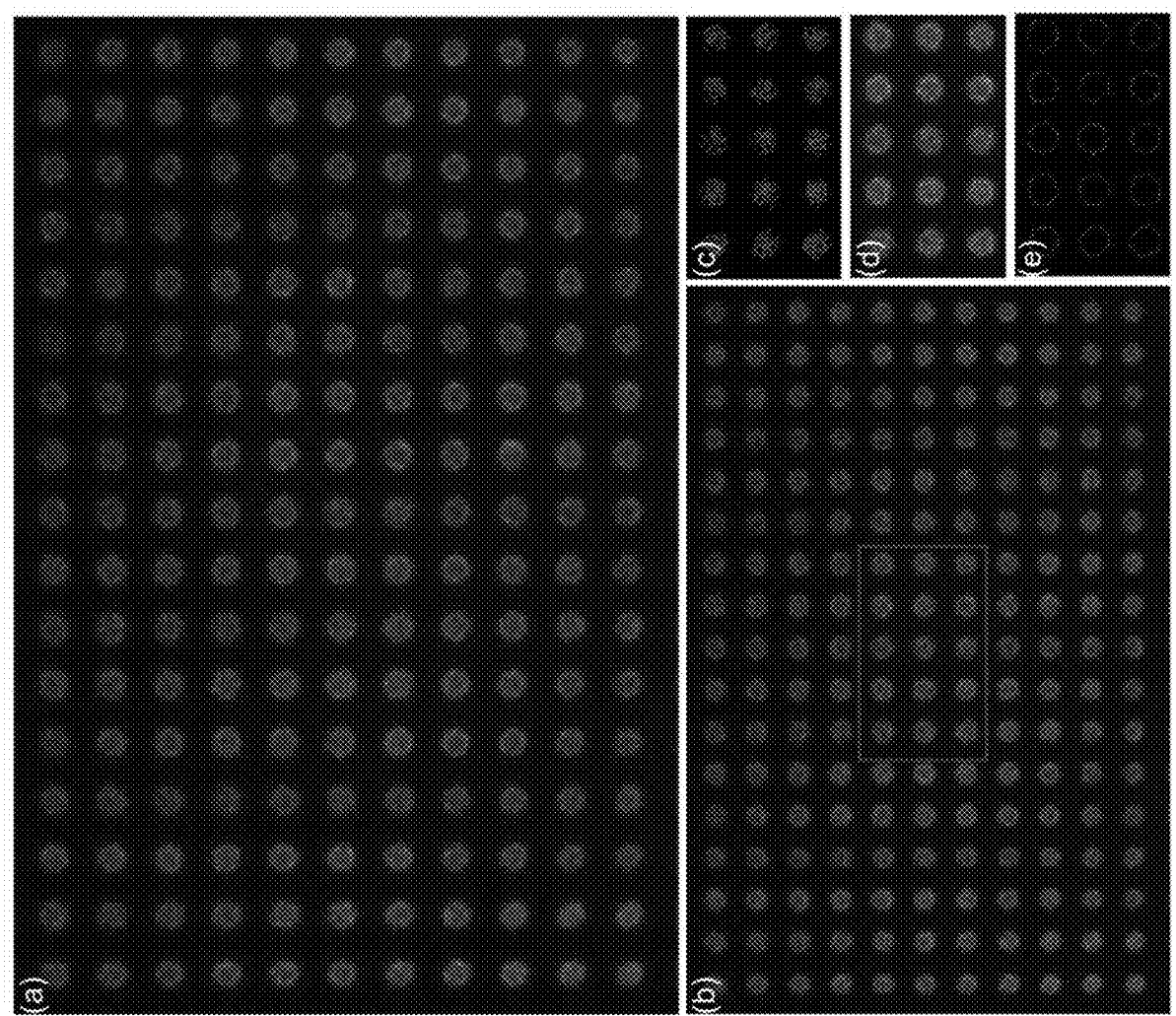
FIG. 24 is a diagram illustrating data preprocessing results for the structured-light image in one embodiment of the invention.

In this embodiment, the structured-light imaging data processing operation includes data (image data obtained using the structured-light imaging system) preprocessing, LFN for depth estimation, and data (image data obtained using the structured-light imaging system) postprocessing. In this embodiment, the SLN receives and processes preprocessed input and outputs the direct depth result. In this embodiment, the direct depth result is post-processed by AEPF with variance threshold, preferably multiple times. As mentioned, the data processing in the operation of this embodiment include preprocessing, SLN for depth prediction, and postprocessing. It has been found that if the raw images are delivered to the SLN neural network directly, the computation load will be large. In this example, due to limited GPU memory, the neural network is restricted to a relatively simple structure. In the preprocessing, the discriminative features are preliminarily extracted and emphasized. As shown in FIG. 23, the original 5,568×3,712 captured image is preprocessed to obtain three-layer amplified features. This new three-layer image is resized to the size of 696×464 before neural network processing. In this way, the input image is compressed. In this embodiment, SLN is responsible for the semantic recognition of structured-light images. In this embodiment, the postprocessing also adopts AEPF with a variance threshold for better demonstration performance. The depth map resolution is 28×44. The depth map resolution is limited by the array size of metalens and the field of view of other optical elements. The specific resolution depends on the effective use of the metalens array. If the raw image is delivered to the neural network directly, the GPU memory load will be large. Thus, given 5568×3712×3 input, the network has to be limited to a relatively simple structure with a memory limit. Also, there is a large gap between the adjacent points. In this way, specific preprocessing is performed to reduce the input image size while keeping the distinguishing characteristics to the greatest extent. In this example, because the light source used is a green laser, the information in the raw picture is concentrated on the G channel. The data values of other channels are close to zero. Following this, the G channel data is selected as one channel of preprocessing output. And the feature information of G channel data is extracted by the Canny operator after denoising of Gaussian filter. This channel emphasizes the features of the structured-light points. Another channel is the edge of each point with the support of the Otsu method and Canny edge detector. Then these channels are combined into a new image in the order of feature information, original G channel information, and edge information. It should be noted that the order of combination can be modified, in some other embodiments. FIG. 24 shows the results of each of these steps. Briefly, in FIG. 24, (a) is the raw image, (b) is the preprocessing output, (c)-(e) are feature information, original G channel information, and edge information, respectively.

More details of the LFN and SLN are provided below.

In one example, both LFN and SLN are developed using a computer system with Intel® Core™ i9-10900K CPU @ 3.70 GHz, 32 Gigabytes of RAM, and NVIDIA GeForce RTX 3080 GPU.

In this embodiment, the LFN is a combination of encoder and decoder. In this embodiment, the encoder-decoder framework mainly contains residual blocks with two interblock short connections. Specifically, given a 36×56 disparity map, four residual blocks followed by pooling layers are adopted to obtain a low-resolution categorical prototype, which contains abundant high-level semantic representations. Except for the last stage with stride 2, the pooling layers with stride 1 are adopted in the former stages under the allowance of GPU memory, which can keep the spatial information as much as possible. To recover the spatial resolution for the decoding process, a deconvolutional layer is used on the half-sized feature map, which can recover the feature scale to the original one. Another four residual blocks for feature decoding and a 3×3 convolutional layer for classification are performed. And there is a quartic function transformation at the end of the network. In this example, the training dataset of LFN consists of 6 groups of scanning images captured at the 1-cm interval and 82 randomly arranged multi-board pictures, which are 268 samples in total. For scanning images, the whole image has the same depth. The depth ground truth of multi-board pictures is manually annotated. Test set contains 3 groups of scanning images captured at the 0.5-cm interval and 36 multi-board pictures, which are 219. The cost function used is smooth L1 loss. Adam optimizer and 2e-4 initial learning rate are adopted. The batch size is 4. The total training iteration is 90,000. After 50,000-iteration training, the learning rate decreases to 2e-5.

The accuracy of 1 cm is used during training, while the network showed accurate predictions for data with an accuracy of 0.5 cm during evaluation. This means that the network has good generalization capabilities. Through in-depth analysis of information, LFN fits discrete prior information into a continuous function response.

In this embodiment, SLN is similar to a down-sampling process. The early stages of SLN form an encoder structure. The 3712×5568 raw image is preprocessed to obtain the compressed 464×696 variant. This compressed variant is delivered into the neural network as input. Double 7×7 convolutions are performed for large sense-field information processing before resolution reduction to the greatest extent. With the initial pooling layer completed, four convolution-pool blocks take over the following feature extraction. Because this network works for a measurement system, it should be sensitive to small data changes.

Figure 25:
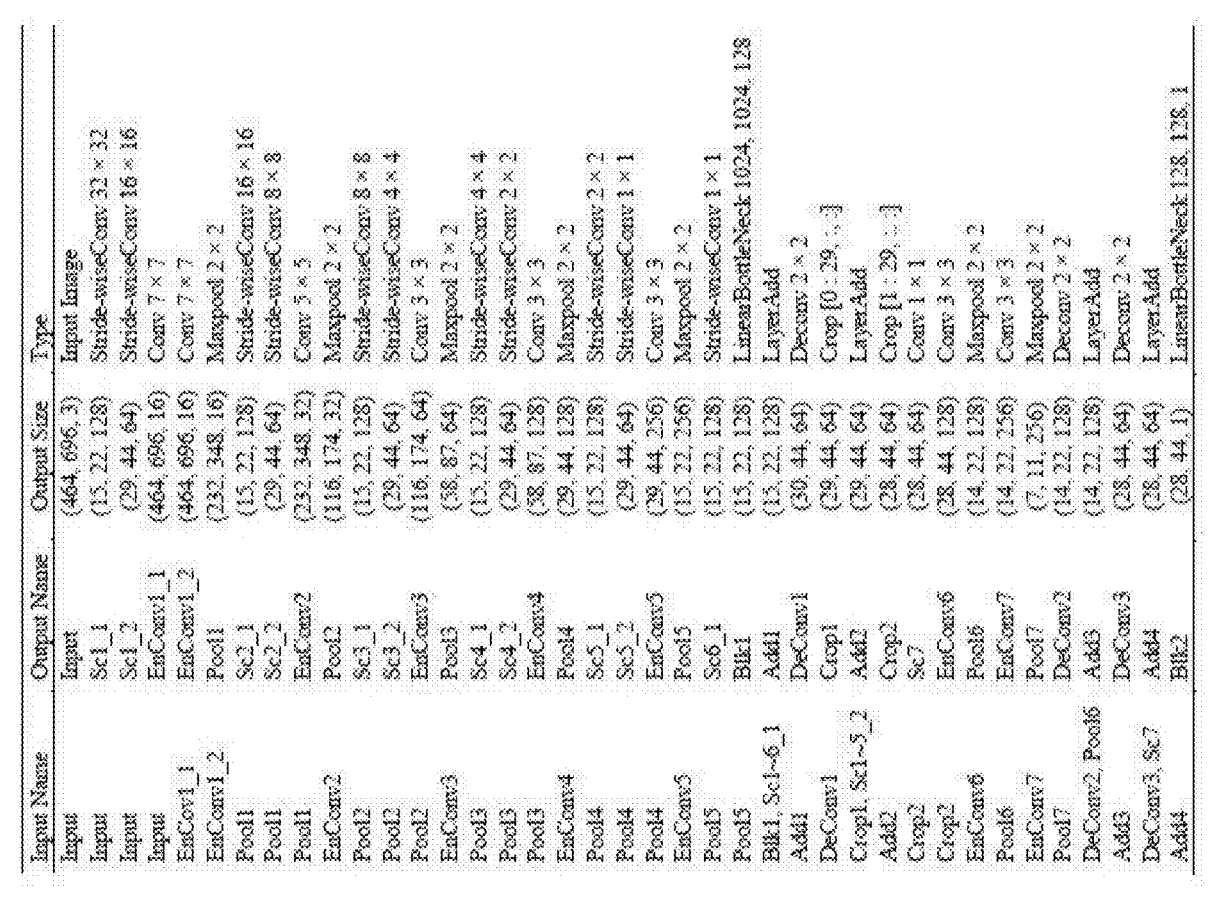

To prevent the non-linear operation of high dimensional data space from destroying too much information, the linear bottleneck from mobilenetV2 is adopted. In order to promise a certain output size, a deconvolutional layer is performed. Features in encoding stages are short connected to the front and back of the first deconvolution layer to reduce the gradient vanishing and to strengthen the feature delivery. To match the size of the layer connection, the network includes some cropping modules. A simple and tiny U-shape block and another linear bottleneck are cascaded before output to do feature fusion and dimensionality reduction. The specific layer parameters are listed in FIG. 25. The training dataset of SLN includes 18 groups of scanning images captured at the 0.5 cm interval, which are 1,080 in total. 16 groups (960 samples) are used as the training set and two groups (120 samples) are used as the test set.

Figure 26:
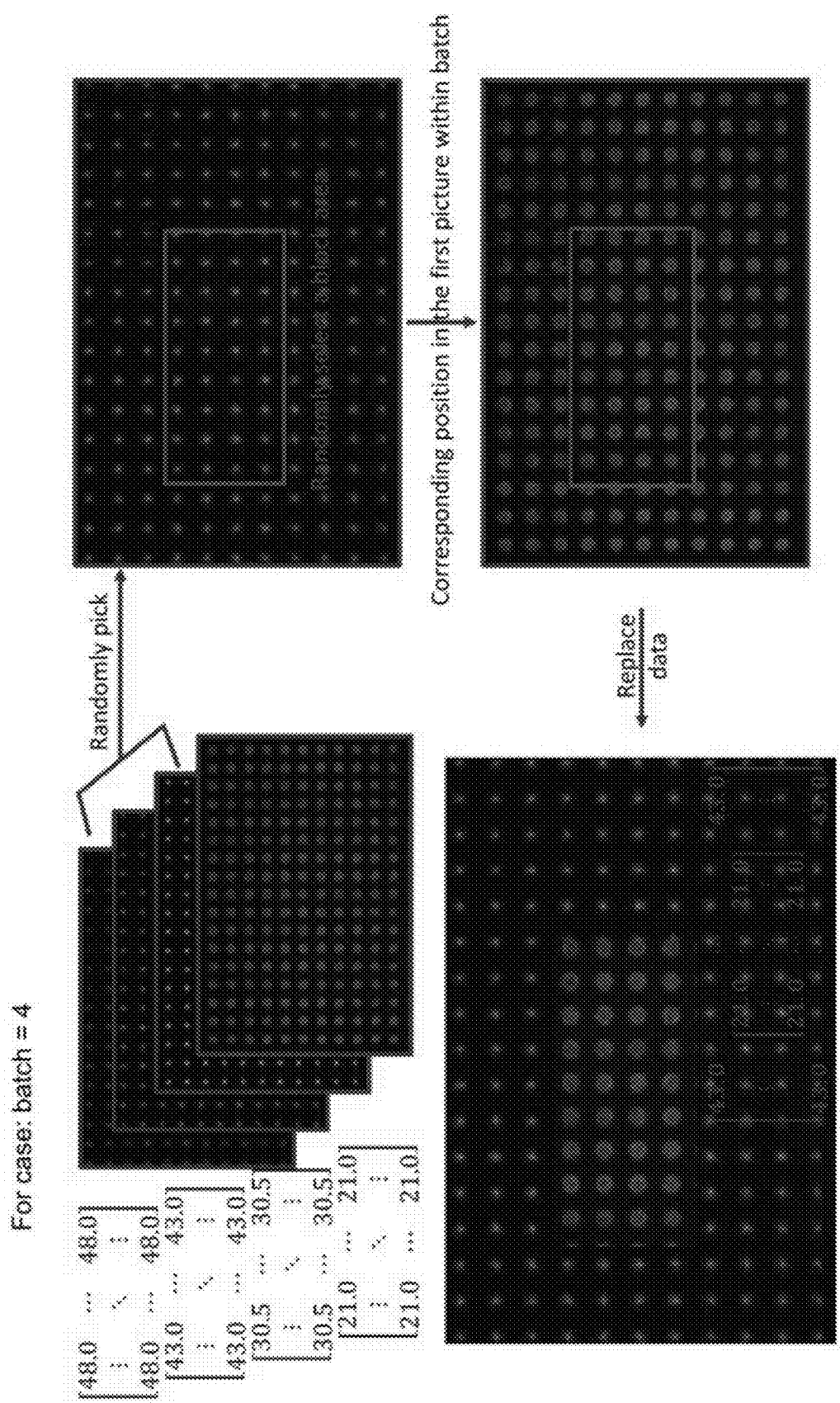
FIG. 26 is a schematic diagram illustrating a mix-up operation for generating multi-board picture for use in training the CNN-based model of FIG. 19 in one embodiment of the invention.
Figure 27B:
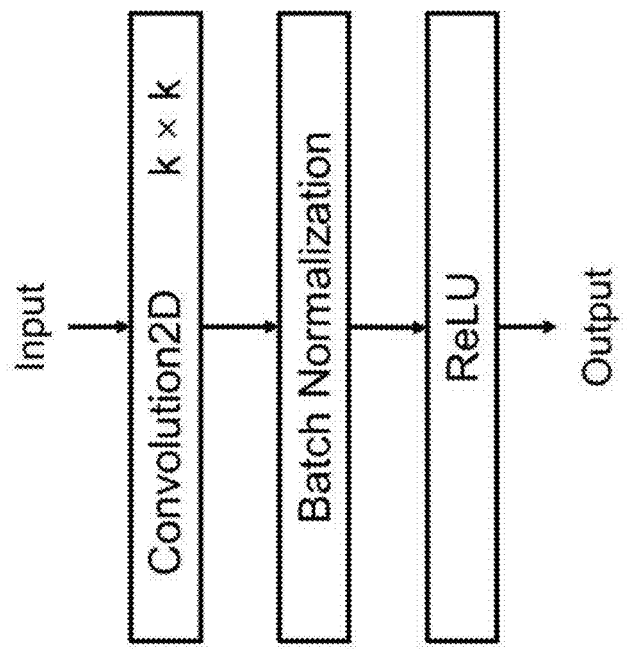
FIG. 27B is a schematic diagram illustrating a convolution block in the CNN-based model of FIG. 19 in one embodiment of the invention.
Figure 27A:
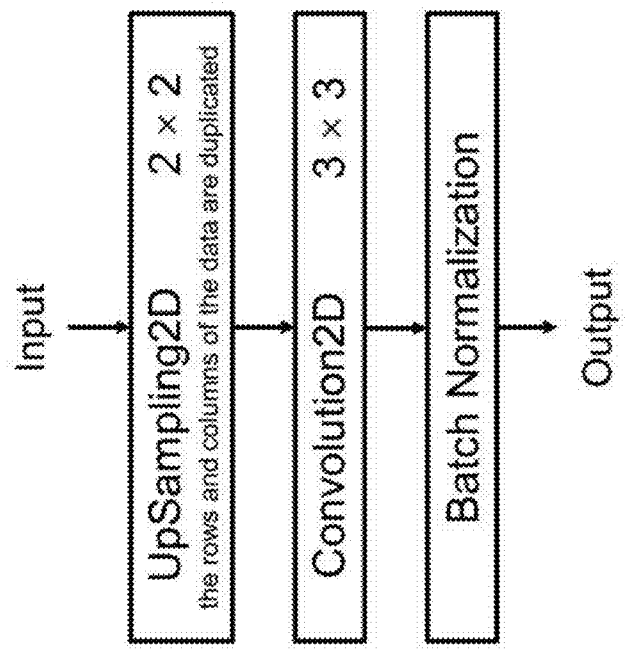
FIG. 27A is a schematic diagram illustrating a deconvolution block in the CNN-based model of FIG. 19 in one embodiment of the invention.

In one example, for the system to perform depth information extraction on multiple-depth scene, multi-board images are used in training. Manual labelling of depth ground truth for the multi-board images can be used but it is time-consuming. As an alternative, a mix-up operation is performed to generate a multi-board picture used in training the SLN of FIG. 19 or FIG. 25. FIG. 26 illustrates a mix-up operation for generating multi-board picture for use in training the CNN-based model in one embodiment. In this embodiment, during training, one multi-board picture is generated in each batch (changed from one original piece in the batch). The data in a random-position block of the picture to be changed is replaced by the data in the corresponding positions of the first picture in the batch to form a new multi-board picture. This process can be considered as a way to perform data augmentation. It trains the SLN such that is can operate and process multiple-depth scene/multi-board images to extract depth information. In one example, Gaussian random white noise can be added to the pictures during training. The cost function used in SLN in this embodiment is the mean-square error (MSE). In this embodiment, Adam optimizer, initial batch size of 4, and initial learning rate of $2e^{-3}$ are applied. The evaluation loss is taken as the monitoring indicator. After the evaluation loss stops decreasing, 8 epochs is counted (waited), and the batch size is increased to twice the original, and the learning rate is reduced to one-tenth of the original. In this example, the maximum limit of batch size is 32, and the minimum limit of learning rate is 2e-6. In the example model of FIG. 25, each Add layer is followed by an Activation layer of ReLU. Stride-wiseConv means the kernel is of size k, and the convolution stride is also k. The three numbers following LinearBottleNeck are the output channel numbers in Linear BotterNeck. The padding of all convolutional layers is set to "same mode". The deconvolution block in this embodiment is shown in FIG. 27A. The deconvolution block is used to expand the resolution of features. It is worth noting that there is no Activation layer following the Batch Normalization layer. FIG. 27B shows the architecture of the convolution block, with a convolution layer of k-size kernel followed by a Batch Normalization and a rectified linear unit (ReLU) in this embodiment.

Figure 28:
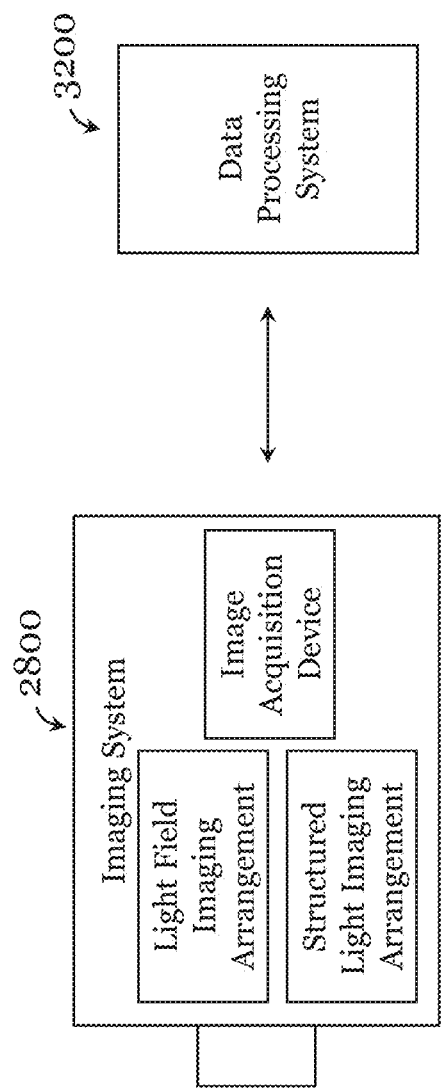
FIG. 28 is a schematic diagram illustrating an imaging system and a data processing system in some embodiments of the invention.

FIG. 28 shows an imaging system 2800 and a data processing system 3200 in some embodiments of the invention. The imaging system and data processing system can form a depth detection system. The imaging system 2800 in these embodiments include an image acquisition device, a light-field imaging arrangement with an optical meta-device operable to facilitate imaging of a light-field of a target scene, and a structured-light imaging arrangement with an optical meta-device operable to facilitate generation of structured-light to be provided to a target scene to facilitate imaging of the target scene. The light-field imaging arrangement and the structured-light imaging arrangement are operably coupled with the image acquisition device such that the imaging system 2800 is selectively operable in, at least, a light-field imaging mode for performing light-field imaging of the target scene and a structured-light imaging mode for performing structured-light imaging of the target scene. In some of these embodiments, the light-field imaging arrangement and the structured-light imaging arrangement include one or more common optical components. For example, the optical meta-device of the light-field imaging arrangement may be the optical meta-device of the structured-light imaging arrangement. In some of these embodiments, the optical meta-device comprises a meta-lens array, e.g., with a plurality of achromatic meta-lenses, such as the ones described above. In some of these embodiments, the light-field imaging arrangement may be the same or similar to the light-field imaging arrangement in FIG. 3 or 13. In some of these embodiments, the structured-light imaging arrangement may be the same or similar to the structured-light imaging arrangement in FIG. 4 or 17. In some of these embodiments, the imaging system 2800 further includes a sensor operable to detect light in an environment in which the imaging system and/or the target scene is arranged, and a controller operably coupled with the sensor to control operation of the imaging system in the light-field imaging mode and/or the structured-light imaging mode based on the light detected by the sensor. For example, when the amount of light detected by the sensor is at or above a first threshold, the controller operate or facilitate operation of the imaging system 2800 in the light-field imaging mode; when the amount of light detected by the sensor is at or below a second threshold (which may be the same as or different from the first threshold), the controller operate or facilitate operation of the imaging system 2800 in the structured-light imaging mode (e.g., activates the light source). In some of these embodiments, the imaging system 2800 additionally or alternatively includes a user-actuatable mode selector for selecting operation mode of the imaging system, the operation mode including, at least, the light-field imaging mode and the structured-light imaging mode. The controller or another controller of the imaging system 2800 may be operably coupled with the user-actuatable mode selector to control operation of the imaging system in the selected operation mode. In FIG. 29, the data processing system 2900 is operably connected with the imaging system 2800. The data processing system 2900 is arranged to process the light-field image of the target scene obtained by the imaging system using a machine learning based model (such as LFN described above) to determine depth information associated with the target scene or one or more objects in the target scene, and process the structured-light image of the target scene obtained by the imaging system using a machine learning based model (such as SLN described above) to determine depth information associated with the target scene or one or more objects in the target scene. The data processing system 2900 may perform one or more of the image data processing methods described above, to determine depth information from the corresponding images. In some embodiments, the data processing system 2900 can be arranged separately from (e.g., remote from) the imaging system 2800. In some embodiments, the data processing system 2900 can be at least partly, or entirely, integrated to the imaging system 2800.

FIG. 29 shows a light-field imaging system 2900 in some embodiments of the invention. In these embodiments, the light-field imaging system 2900 corresponds to the imaging system 2800 without the structured-light imaging arrangement.

FIG. 30 shows a structured-light imaging system 3000 in some embodiments of the invention. In these embodiments, the structured-light imaging system 3000 corresponds to the imaging system 2800 without the light-field imaging arrangement.

FIG. 31 shows an imaging system 3100 in some embodiments of the invention. In these embodiments, the imaging system 3100 corresponds to the combination of the light-field imaging system 2900 (with its own image acquisition device) and the structured-light imaging system 3000 (with its own image acquisition device), which may be arranged in the same housing or chassis.

FIG. 32 shows an example data processing system 3200 that can be used as to process image data obtained by the imaging systems such as but not limited to any one or more of the imaging systems in FIGS. 3, 4, 13, 17, and 28-31. The data processing system 3200 generally comprises suitable components necessary to receive, store, and execute appropriate computer instructions, commands, and/or codes. The main components of the data processing system 3200 are a processor 3202 and a memory (storage) 3204. The processor

3202 may include one or more: CPU(s), MCU(s), GPU(s), logic circuit(s), Raspberry Pi chip(s), digital signal processor(s) (DSP), application-specific integrated circuit(s) (ASIC), field-programmable gate array(s) (FPGA), and/or any other digital or analog circuitry/circuitries configured to interpret and/or to execute program instructions and/or to process signals and/or information and/or data. The memory 3204 may include one or more volatile memory (such as RAM, DRAM, SRAM, etc.), one or more non-volatile memory (such as ROM, PROM, EPROM, EEPROM, FRAM, MRAM, FLASH, SSD, NAND, NVDIMM, etc.), or any of their combinations. Appropriate computer instructions, commands, codes, information and/or data may be stored in the memory 3204. For example, the data processing algorithms and machine learning based models (e.g., LFN, SLN, etc.) may be stored in the memory 3204 for use in data processing. Training/testing/validation data for the machine learning based models may also be stored in the memory 3204. Computer instructions for executing or facilitating executing the method embodiments (the image data processing methods) of the invention may be stored in the memory 3204. The processor 3202 and memory (storage) 3204 may be integrated or separated (and operably connected). Optionally, the data processing system 3200 further includes one or more input devices 3206. Examples of such input device 3206 include: keyboard, mouse, stylus, image scanner, microphone, tactile/touch input device (e.g., touch sensitive screen), image/video input device (e.g., camera), etc. Optionally, the data processing system 3200 further includes one or more output devices 3208. Examples of such output device 3208 include: display (e.g., monitor, screen, projector, etc.), speaker, headphone, earphone, printer, additive manufacturing machine (e.g., 3D printer), etc. The display may include a LCD display, a LED/OLED display, or other suitable display, which may or may not be touch sensitive. The data processing system 3200 may further include one or more disk drives 3212 which may include one or more of: solid state drive, hard disk drive, optical drive, flash drive, magnetic tape drive, etc. A suitable operating system may be installed in the data processing system 3200, e.g., on the disk drive 3212 or in the memory 3204. The memory 3204 and the disk drive 3212 may be operated by the processor 3202. Optionally, the data processing system 3200 also includes a communication device 3210 for establishing one or more communication links (not shown) with one or more other computing devices, such as servers, personal computers, terminals, tablets, phones, watches, IoT devices, or other wireless computing devices. The communication device 3210 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, a cellular (2G, 3G, 4G, 5G, above 5G, or the like) transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 3202, the memory 3204 (optionally the input device(s) 3206, the output device(s) 3208, the communication device(s) 3210 and the disk drive(s) 3212, if present) are connected with each other, directly or indirectly, through a bus, a Peripheral Component Interconnect (PCI), such as PCI Express, a Universal Serial Bus (USB), an optical bus, or other like bus structure. In one embodiment, at least some of these components may be connected wirelessly, e.g., through a network, such as the Internet or a cloud computing network. A person skilled in the art would appreciate that the data processing system 3200 shown in FIG. 13 is merely an example and that the data processing system 3200 can in other embodiments have different configurations (e.g., include additional components, has fewer components, etc.).

Although not required, the embodiments described with reference to the Figures can be implemented as an application programming interface (API) or as a series of libraries for use by a developer or can be included within another software application, such as a terminal or computer operating system or a portable computing device operating system. Generally, as program modules include routines, programs, objects, components and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

Embodiments of the invention have provided various useful features and advantages. Some embodiments have provided a multi-function meta-device, in the form of a meta-lens array, suitable for multi light level depth sensing applications. Some embodiments have provided a depth mapping and imaging system with the complementary integration of light-field collection and structured-light projection modes. Some embodiments have provided neural networks and deep learning methods for processing imaging data to perform depth-sensing in the light-field imaging collection mode and active structured-light mode. It has been shown that accurate depth mapping within the 21.0 cm to 50.5 cm operation range can be obtained. True depth sensing enabled by some embodiments can be used to solve the optical illusion issues. The imaging device and/or data processing device embodiments of the invention can be applied to various applications such as industrial inspection, machine vision, human-computer interaction, augmented reality, virtual reality, mixed reality, biometric identification, autonomous system, and applications that require compact imaging and range sensing modules with limited space and light conditions.

Some embodiments of the invention provide an intelligent depth sensing system that is operable in different light conditions/light intensities. Some imaging and/or data processing system embodiments of the invention has the characteristics of being compact and can be readily integrated to other systems and devices. Some imaging and/or data processing system embodiments of the invention can be applied to image different scenes in various atmospheric environments, aquatic environments, light levels, and texture levels. Some embodiments of the intelligent depth sensing system uses an achromatic meta-lens array with special optical path design. The meta-lens array in some embodiments is super-hydrophobic, can provide anti-adhesion, stain-resistant and/ or self-cleaning capabilities. In some embodiments, the fabrication process in which the meta-lens array is grown on the same substrate makes the system free of system calibration. Under sufficient light conditions, some embodiments of the system acts as a light-field camera to collect light-field information. Under no-light or dark or dim conditions, some embodiments of the system acts as a structured-light imaging system. The same meta-lens array can be used in the light-field camera and the structured-light imaging system—it is operable as the core function of a light-field imaging system or a structured-light projection system. In some embodiments, the depth information of light-field images and structured-light images can be analyzed and extracted through respective convolutional neural network.

The achromatic meta-lens in some embodiments adopts the nanostructure of Gallium Nitride (GaN) material to achieve spherical aberration-free, chromatic aberration-free, and energy-efficient imaging. GaN is a mechanically and chemically stable material, resistant to high temperatures, acids, and alkalis, and can adapt to various environments and even extreme conditions. The experimental results of water droplet contact angles exceeding 1500 demonstrate the superhydrophobicity of the GaN nanopillar structure. The superhydrophobic properties of GaN nanostructured meta-lens can enable anti-adhesion, anti-fouling, and self-cleaning capabilities. This makes the optical measurement (incorporating the achromatic meta-lens) operable in various different atmospheric environments and aquatic environments. In some embodiments the uniform height of the nanoantenna makes the meta-lens a flat optical device, i.e., essentially free of spherical aberration. The design of the integrated resonance unit eliminates the chromatic aberration of the meta-lens. The meta-lens array used in some embodiments is grown on the same substrate. The meta-lens fabrication technology of some embodiments ensures that the image plane of the meta-lens array is naturally in the same plane, hence no system calibration may be required.

Some embodiments of the invention may include one or more of the following advantages or characteristics. Some embodiments of the invention may include one or more addition advantages or characteristics not illustrated here. For example, some embodiments of the imaging system can be applied to perform imaging in different atmospheric conditions and different aquatic environmental conditions. For example, some embodiments of the imaging system can operate under different light conditions (bright or dark conditions). For example, for some embodiments of the imaging system, the depth sensing is not affected by the level of scene texture. For example, GaN structured meta-lens in some embodiments has super-hydrophobicity, anti-adhesion, anti-contamination, and self-cleaning ability. For example, multiplexed compact imaging system designed based on the same metal-lens array in some embodiments does not require system calibration or image correction for proper operation. For example, some embodiments enable achromatic imaging without spherical aberration. For example, some embodiments provide a data processing means/method for light-field and structured-light image data processing based on deep learning.

It will be appreciated by persons skilled in the art that variations and/or modifications may be made to the invention as shown in the specific embodiments to provide other embodiments of the invention. The described embodiments of the invention should therefore be considered in all respects as illustrative, not restrictive. Example optional features of some aspects of the invention are set forth in the above summary of the invention. Some embodiments of the invention may include one or more of these optional features (some of which are not specifically illustrated in the drawings). Some embodiments of the invention may lack one or more of these optional features (some of which are not specifically illustrated in the drawings). One or more features in one embodiment and one or more features in another embodiment may be combined to provide further embodiment(s) of the invention. For example, the operation range of the imaging system of the invention is not limited to those in the above embodiments. For example, the number of meta-lens of the meta-lens array can be different from those illustrated in the above embodiments. For example, the light source in the structured-light imaging armament in some embodiments may be a visible light light source (different from the laser source illustrated in the above embodiments). In some embodiments, the meta-lens may include one of more of the following properties: super-hydrophobicity, anti-adhesion, stain-resistant and self-cleaning ability. In some embodiments, the imaging system does not require spherical aberration correction and system calibration. In some embodiments, the imaging system may be operable to selectively perform light-field imaging and structured-light imaging. The imaging system in these embodiments may include light-field imaging arrangement and structured-light imaging arrangement. These arrangements may or may not include common optical components. In some embodiments, the imaging system may be operable to selectively perform only light-field imaging, i.e., only has light-field imaging arrangement, no structured-light imaging arrangement. In some embodiments, the imaging system may be operable to selectively perform only structured-light imaging, i.e., only has structured-light imaging arrangement, no light-field imaging arrangement.

The invention claimed is:
1. An imaging system, comprising:
an image acquisition device;
a light-field imaging arrangement including a meta-lens array operable to facilitate imaging of a light-field of a target scene; the meta-lens array comprising a plurality of achromatic meta-lenses; and
a structured-light imaging arrangement including the meta-lens array that is shared by the light-field imaging arrangement, the meta-lens array operable to facilitate generation of a focused light spot array as a structured-light to be provided to a target scene to facilitate imaging of the target scene;
a sensor operable to detect light in an environment in which the imaging system and/or the target scene is arranged; and
a controller operably coupled with the sensor to control operation of the imaging system in the light-field imaging mode and/or the structured-light imaging mode based on the light detected by the sensor;
wherein the light-field imaging arrangement and the structured-light imaging arrangement are operably coupled with the image acquisition device such that the imaging system is selectively operable in, at least, a light-field imaging mode for performing light-field imaging of the target scene and a structured-light imaging mode for performing structured-light imaging of the target scene;
wherein in the structured-light imaging mode, the image acquisition device is adapted to generate a light spot array image based on reflected structured-light from the target scene, the light spot array image adapted to be processed to obtain depth information associated with the target scene; and wherein the controller is operable to:
operate or facilitate operation of the imaging system in the light-field imaging mode when an amount of light detected by the sensor is at or above a threshold; and/or
operate or facilitate operation of the imaging system in the structured-light imaging mode when an amount of light detected by the sensor is at or below a threshold.

2. The imaging system of claim 1, wherein the light-field imaging arrangement and the structured-light imaging arrangement include one or more common optical components.

3. The imaging system of claim 1, wherein the light-field imaging arrangement further includes:
a lens arranged to receive light-field associated with the target scene;
a first optical assembly optically coupled between the lens and the meta-lens array; and
a second optical assembly optically coupled between the meta-lens array and the image acquisition device;
wherein the first optical assembly, the meta-lens array, and the second optical assembly are arranged to process the received light-field for imaging by the image acquisition device.

4. The imaging system of claim 3, wherein the first optical assembly comprises:
a polarization beam splitter;
a polarization manipulation assembly optically coupled with the polarization beam splitter; and
an objective lens optically coupled with the polarization manipulation assembly.

5. The imaging system of claim 4, wherein the polarization manipulation assembly comprises: a quarter-wave plate and a linear polarizer that are optically coupled.

6. The imaging system of claim 3, wherein the second optical assembly comprises:
an objective lens;
a polarization manipulation assembly optically coupled between the objective lens and the image acquisition device; and
a beam splitter optically coupled between the meta-lens array and the objective lens.

7. The imaging system of claim 6, wherein the polarization manipulation assembly comprises:
a quarter-wave plate, a polarization beam splitter, and a linear polarizer that are optically coupled.

8. The imaging system of claim 1, wherein the structured-light imaging arrangement further comprises:
a light source;
a first optical assembly optically coupled between the light source and the meta-lens array; and
a second optical assembly optically coupled with the meta-lens array and the image acquisition device;
wherein the second optical assembly is operable to guide and provide the structured-light to the target scene and to receive or process light reflected from the target scene as a result of the light provided to the target scene.

9. The imaging system of claim 8, wherein the light source comprises a laser source.

10. The imaging system of claim 8, wherein the first optical assembly comprises:
a polarization manipulation assembly; and
a beam splitter optically coupled between the polarization manipulation assembly and the meta-lens array.

11. The imaging system of claim 10, wherein the polarization manipulation assembly comprises a quarter-wave plate and a linear polarizer.

12. The imaging system of claim 11, wherein the linear polarizer is optically coupled between the quarter-wave plate and the light source.

13. The imaging system of claim 10, wherein the first optical assembly further comprises:
one or more lens optically coupled with the light source; and
a reflector optically coupled between the one or more lens and the polarization manipulation assembly.

14. The imaging system of claim 8, wherein the second optical assembly comprises:
an objective lens; and
a polarization manipulation assembly optically coupled with the objective lens;
a polarization beam splitter optically coupled with the polarization manipulation assembly, and operable to guide and provide light to and receive reflected light from the target scene; and
an optical sub-assembly optically coupled between the polarization beam splitter and the image acquisition device to guide and provide the light received from the target scene to the image acquisition device.

15. The imaging system of claim 14, wherein the polarization manipulation assembly comprises: a quarter-wave plate and a linear polarizer that are optically coupled.

16. The imaging system of claim 15,
wherein the linear polarizer is optically coupled between the quarter-wave plate and the polarization beam splitter; and/or
wherein the quarter-wave plate is optically coupled between the objective lens and the linear polarizer.

17. The imaging system of claim 14, wherein the optical sub-assembly comprises:
a linear polarizer optically coupled between the polarization beam splitter and the image acquisition device.

18. The imaging system of claim 17,
wherein the optical sub-assembly further comprises a further polarization beam splitter;
wherein the linear polarizer is optically coupled between the further polarization beam splitter and the image acquisition device; and/or
wherein the further polarization beam splitter is optically coupled between the polarization beam splitter and the image acquisition device.

19. The imaging system of claim 17, wherein the optical sub-assembly further comprises:
an optical guide assembly for guiding light from the polarization beam splitter to the further polarization beam splitter.

20. The imaging system of claim 1, further comprising:
a user-actuatable mode selector for selecting operation mode of the imaging system, the operation mode including, at least, the light-field imaging mode and the structured-light imaging mode; and
a controller operably coupled with the user-actuatable mode selector to control operation of the imaging system in the selected operation mode.

21. The imaging system of claim 1, further comprising:
one or more processors arranged or programmed to:
process a light-field image of the target scene obtained by the imaging system using a machine learning based model to determine the depth information associated with the target scene or one or more objects in the target scene, and/or process a structured-light image of the target scene obtained by the imaging system using a machine learning based model to determine the depth information associated with the target scene or one or more objects in the target scene;

wherein the machine learning based model for processing the light-field image and the machine learning based model for processing the structured-light image are different models.

22. An imaging system comprising:

an image acquisition device;

a structured-light imaging arrangement including an meta-lens array operable to facilitate generation of a focused light spot array as a structured-light to be provided to a target scene to facilitate imaging of the target scene; the meta-lens array comprising a plurality of achromatic meta-lenses; and a data processing device connected to the image acquisition device; the data processing device adapted to generate the depth information associated with the target scene based on shapes and sizes of light spots as well as distances between the light spots in the light spot array image;

wherein the structured-light imaging arrangement are optically coupled with the image acquisition device such that the imaging system operable in, at least, a structured-light imaging mode for performing structured-light imaging of the target scene; and wherein in the structured-light imaging mode, the image acquisition device is adapted to generate a light spot array image based on reflected structured-light from the target scene, the light spot array image adapted to be processed to obtain depth information associated with the target scene.

23. The imaging system of claim 21, wherein the structured-light imaging arrangement further comprises:

a light source;

a first optical assembly optically coupled between the light source and the meta-lens array; and a second optical assembly optically coupled with the meta-lens array and the image acquisition device;

wherein the second optical assembly is operable to guide and provide the structured-light to the target scene and to receive or process light reflected from the target scene as a result of the light provided to the target scene.

24. An imaging system, comprising:

an image acquisition device;

a light-field imaging arrangement including a meta-lens array operable to facilitate imaging of a light-field of a target scene; the meta-lens array comprising a plurality of achromatic meta-lenses; and a structured-light imaging arrangement including the meta-lens array that is shared by the light-field imaging arrangement, the meta-lens array operable to facilitate generation of a focused light spot array as a structured-light to be provided to a target scene to facilitate imaging of the target scene; and a data processing device connected to the image acquisition device; the data processing device adapted to generate the depth information associated with the target scene based on shapes and sizes of light spots as well as distances between the light spots in the light spot array image;

wherein the light-field imaging arrangement and the structured-light imaging arrangement are operably coupled with the image acquisition device such that the imaging system is selectively operable in, at least, a light-field imaging mode for performing light-field imaging of the target scene and a structured-light imaging mode for performing structured-light imaging of the target scene;

wherein in the structured-light imaging mode, the image acquisition device is adapted to generate a light spot array image based on reflected structured-light from the target scene, the light spot array image adapted to be processed to obtain depth information associated with the target scene.

* * * * *